United States Patent
Tsuboi et al.

(10) Patent No.: US 10,653,283 B2
(45) Date of Patent: May 19, 2020

(54) SELF-PROPELLED ELECTRONIC DEVICE AND TRAVEL METHOD FOR SAID SELF-PROPELLED ELECTRONIC DEVICE

(71) Applicant: Sharp Kabushiki Kaisha, Sakai, Osaka (JP)

(72) Inventors: Masanori Tsuboi, Sakai (JP); Masashi Matsumoto, Sakai (JP); Toshihiro Senoo, Sakai (JP); Fumio Yoshimura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/552,464

(22) PCT Filed: Mar. 1, 2016

(86) PCT No.: PCT/JP2016/056246
§ 371 (c)(1),
(2) Date: Aug. 21, 2017

(87) PCT Pub. No.: WO2016/203790
PCT Pub. Date: Dec. 22, 2016

(65) Prior Publication Data
US 2018/0049613 A1   Feb. 22, 2018

(30) Foreign Application Priority Data
Jun. 15, 2015 (JP) .................. 2015-120335

(51) Int. Cl.
*B60L 50/51* (2019.01)
*B60L 58/21* (2019.01)
(Continued)

(52) U.S. Cl.
CPC ............. *A47L 9/2815* (2013.01); *A47L 9/009* (2013.01); *A47L 9/28* (2013.01); *A47L 9/2805* (2013.01);
(Continued)

(58) Field of Classification Search
CPC .................. A47L 9/19; A47L 11/30
(Continued)

(56) References Cited

U.S. PATENT DOCUMENTS 7,620,357 B2 * 11/2009 Shakuto ............ G03G 21/0017
399/349
9,457,471 B2 * 10/2016 Schnittman .......... G05D 1/0227
(Continued)

FOREIGN PATENT DOCUMENTS

JP    2004-522231 A    7/2004
JP    2005-211360 A    8/2005
(Continued)

*Primary Examiner* — Bickey Dhakal
*Assistant Examiner* — Charles S Laughlin
(74) *Attorney, Agent, or Firm* — ScienBiziP, P.C.

(57) ABSTRACT

A self-propelled electronic device comprising: a housing; a drive wheel that enables the housing to travel; a wheel drop sensor that detects loss of contact of the drive wheel with a floor surface; and a travel control unit that controls travel of the housing, wherein, when the wheel drop sensor detects loss of contact of the drive wheel with the floor surface, the travel control unit continues travel of the housing for a predetermined continuous travel time, and if the wheel drop sensor still detects loss of contact of the drive wheel with the floor surface after the continuous travel time has elapsed, the travel control unit stops the rotation of the drive wheel, and then, rotates the drive wheel in a direction opposite to the direction of the rotation for a predetermined reverse travel time, to cause the housing to travel in a reverse direction.

8 Claims, 12 Drawing Sheets

(51) Int. Cl.
*A47L 9/28* (2006.01)
*G05D 1/02* (2020.01)
*A47L 9/00* (2006.01)
*B25J 11/00* (2006.01)

(52) U.S. Cl.
CPC .............. *A47L 9/2852* (2013.01); *G05D 1/02* (2013.01); *G05D 1/0219* (2013.01); *G05D 1/0227* (2013.01); *G05D 1/0238* (2013.01); *G05D 1/0255* (2013.01); *G05D 1/0272* (2013.01); *A47L 2201/04* (2013.01); *A47L 2201/06* (2013.01); *B25J 11/0085* (2013.01); *G05D 2201/0203* (2013.01)

(58) Field of Classification Search
USPC ........ 318/568.11, 568.21, 150, 161, 10, 146, 318/715
See application file for complete search history.

(56) References Cited

U.S. PATENT DOCUMENTS

| | | | |
|---|---|---|---|
| 9,480,380 B2* | 11/2016 | Yoo | ..................... A47L 11/4011 |
| 2003/0025472 A1* | 2/2003 | Jones | ................... G05D 1/0219 |
| | | | 318/568.12 |
| 2004/0207355 A1 | 10/2004 | Jones et al. | |

FOREIGN PATENT DOCUMENTS

| | | |
|---|---|---|
| JP | 2007-011798 A | 1/2007 |
| JP | 2008-220882 A | 9/2008 |
| JP | 2013-45463 A | 3/2013 |
| JP | 2014-176509 A | 9/2014 |
| JP | 2014-186742 A | 10/2014 |
| WO | 02101477 A2 | 12/2002 |

* cited by examiner

FIG. 7(A) Make the drive wheel in contact with the ground
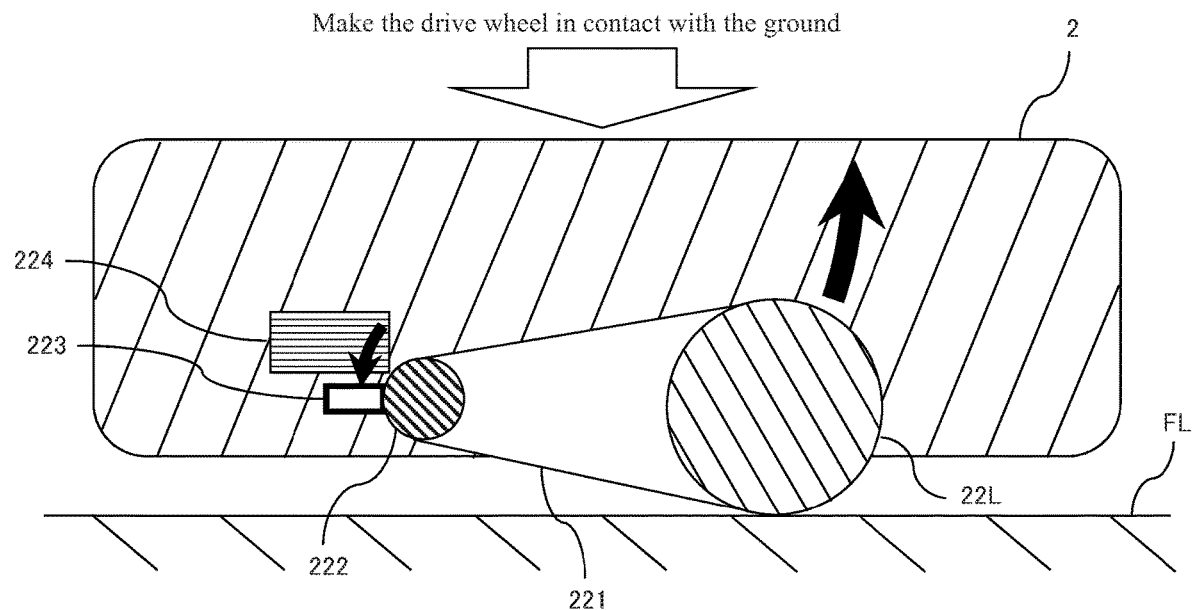
FIG. 7(B) Make the drive wheel separated from the ground
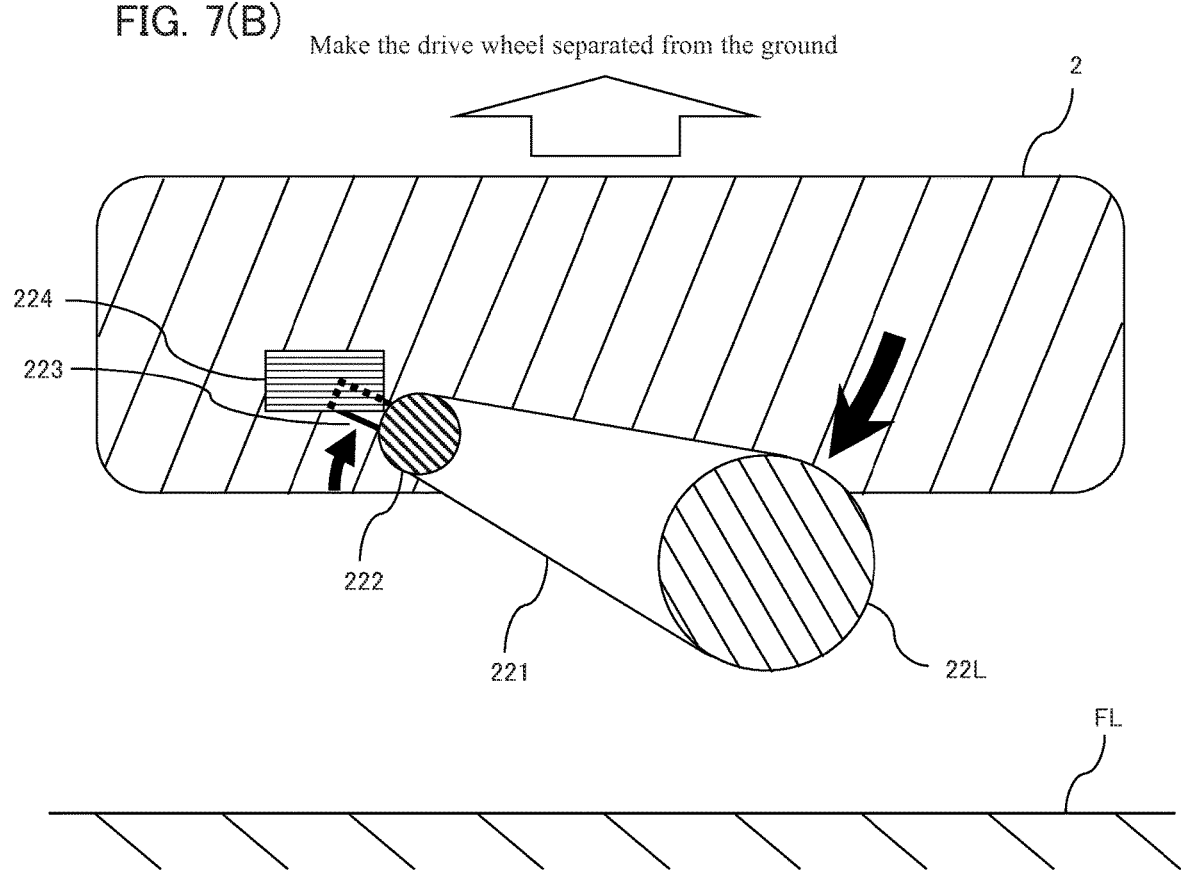

SELF-PROPELLED ELECTRONIC DEVICE AND TRAVEL METHOD FOR SAID SELF-PROPELLED ELECTRONIC DEVICE

TECHNICAL FIELD

The present invention relates to a self-propelled electronic device and a travel method therefor, and more particularly to a self-propelled electronic device having an anti-drop function and a function of climbing over a level difference, and a travel method therefor.

BACKGROUND ART

Conventionally, there has been known a self-propelled electronic device that performs a job such as cleaning, while autonomously traveling on an indoor space or an outdoor space. Such a self-propelled electronic device may be provided with a wheel drop sensor for detecting whether or not a wheel drop condition in which a drive wheel drops off from a floor surface occurs, to prevent the self-propelled electronic device from falling down a downward level difference during autonomous traveling.

The wheel drop sensor detects loss of contact of a drive wheel with a floor surface due to a wheel drop condition in which the drive wheel drops off from the floor surface on a downward level difference. The self-propelled electronic device having an anti-drop function immediately performs an anti-drop operation to prevent a main body from falling down the floor surface, when the wheel drop sensor detects loss of contact of the drive wheel with the floor surface.

Conventionally, as a self-propelled electronic device provided with the wheel drop sensor described above, an invention of a mobile robot cleaner is disclosed in which, when a drop-off of a wheel is detected by the wheel drop sensor, for example, a moving unit is controlled such that the wheel is driven to rotate in the reverse direction for a short time, and then, stops (for example, see Patent Document 1).

In addition, an invention of a self-propelled vacuum cleaner is disclosed which is configured as described below. Specifically, under a condition where loss of contact of a drive wheel with the floor surface is detected by a loss-of-contact detection unit, if a cleaner main body is determined to be close to the floor surface within a predetermined range based on an output from a level difference sensor, the cleaner determines that the drive wheel drops off from a level difference on the floor surface, and tries to escape from the level difference by driving the drive wheel, and if the cleaner main body is determined to be distant from the floor surface beyond the predetermined range based on the output from the level difference sensor, the cleaner determines that the cleaner main body is carried by a user, and stops the drive wheel (for example, see Patent Document 2).

CITATION LIST

Patent Document

Patent Document 1: Japanese Unexamined Patent Publication No. 2014-186742
Patent Document 2: Japanese Unexamined Patent Publication No. 2005-211360

SUMMARY OF THE INVENTION

Problem to be Solved by the Invention

It is common that, when a wheel drop condition occurs due to a drive wheel dropping off from the floor surface on a downward level difference, a self-propelled electronic device immediately transfers to an anti-drop operation or stops the drive wheel. This is because, even when one of drive wheels drops off from the floor surface, the device is traveling with the remaining drive wheels being in contact with the floor surface, and the continuation of travel with this state may lead to falling of the main body.

On the other hand, loss of contact of the drive wheel with the floor surface described above may occur due to an impact upon collision between the drive wheel of the self-propelled electronic device and an upward level difference while traveling or due to a climbing action of the main body of the self-propelled electronic device onto the upward level difference.

However, the self-propelled electronic device cannot determine whether the loss of contact of the drive wheel with the floor surface occurs because of the drive wheel dropping off from the floor surface on a downward level difference, or occurs due to an impact upon collision between the drive wheel and an upward level difference or due to a climbing action of the main body of the self-propelled electronic device onto an upward level difference.

Under the condition where the loss of contact of the drive wheel with the floor surface occurs due to an action of attempting to climb over an upward level difference, if an anti-drop operation is performed in such a way that the drive wheel which is detected to have loss of contact with the floor surface is immediately stopped or this drive wheel is driven to rotate in a direction opposite to the rotational direction before the loss of contact is detected, the self-propelled electronic device cannot climb over the upward level difference, and therefore, the function of the self-propelled electronic device may not sufficiently work.

On the other hand, if the drive wheel which is detected to have loss of contact with the floor surface is continuously driven without being stopped even after the loss of contact is detected, the self-propelled electronic device can climb over the upward level difference, but if the loss of contact of the drive wheel with the floor surface is caused by drop-off of the drive wheel from the floor surface, the main body of the self-propelled electronic device may fall down the floor surface.

As described above, in the self-propelled electronic device, there is a trade-off between a function of climbing over an upward level difference and a function of preventing the device from, falling down a floor surface on a downward level difference.

The present invention is accomplished in view of the above circumstance, and aims to provide a self-propelled electronic device which can achieve compatibility between a function of climbing over an upward level difference and a function of preventing the device from falling down a floor surface on a downward level difference, and a travel method therefor.

Means for Solving the Problems

The present invention provides a self-propelled electronic device comprising: a housing; a drive wheel that enables the housing to travel; a wheel drop sensor that detects loss of contact of the drive wheel with a floor surface; and a travel control unit that controls travel of the housing, wherein, when the wheel drop sensor detects loss of contact of the drive wheel with, the floor surface, the travel control unit continues travel of the housing for a predetermined continuous travel time, and if the wheel drop sensor still detects loss of contact of the drive wheel with the floor surface after the continuous travel time has elapsed, the travel control unit stops the rotation of the drive wheel, and then, rotates the drive wheel in a direction opposite to the direction of the rotation for a predetermined reverse travel time, to cause the housing to travel in a reverse direction.

The present invention also provides a travel method for a self-propelled electronic device, wherein, when loss of contact of a drive wheel for enabling a housing to travel with a floor surface is detected, travel of the housing is continued for a predetermined continuous travel time, and if loss of contact of the drive wheel with the floor surface is still detected after the continuous travel time has elapsed, the rotation of the drive wheel is stopped, and then, the drive wheel is rotated in a direction opposite to the direction of the rotation, for a predetermined reverse travel rime, to cause the housing to travel in a reverse direction.

Effect of the Invention

The present invention can implement a self-propelled electronic device which can achieve compatibility between a function of climbing over an upward level difference and a function of preventing the device from falling down a floor surface on a downward level difference, and a travel method therefor.

BRIEF DESCRIPTION OF THE DRAWINGS

FIG. 7 is an explanatory view showing a state of the drive wheel shown in FIG. 6 under a situation where the drive wheel is in contact with the floor surface (FIG. 7(A)) and a situation where the drive wheel loses contact with the floor surface (FIG. 7(B)).

MODE FOR CARRYING OUT THE INVENTION

First Embodiment

Hereinafter, the present invention will be described in more detail with reference to the drawings. It is to be noted that the description below is illustrative in all respects, and should not be construed to limit the present invention.

In the first embodiment, a self-propelled vacuum cleaner 1 will be described as one example of the self-propelled electronic device. However, the present invention is applicable to self-propelled electronic devices (for example, a self-propelled ion generator) other than a vacuum cleaner.

Figure 1:
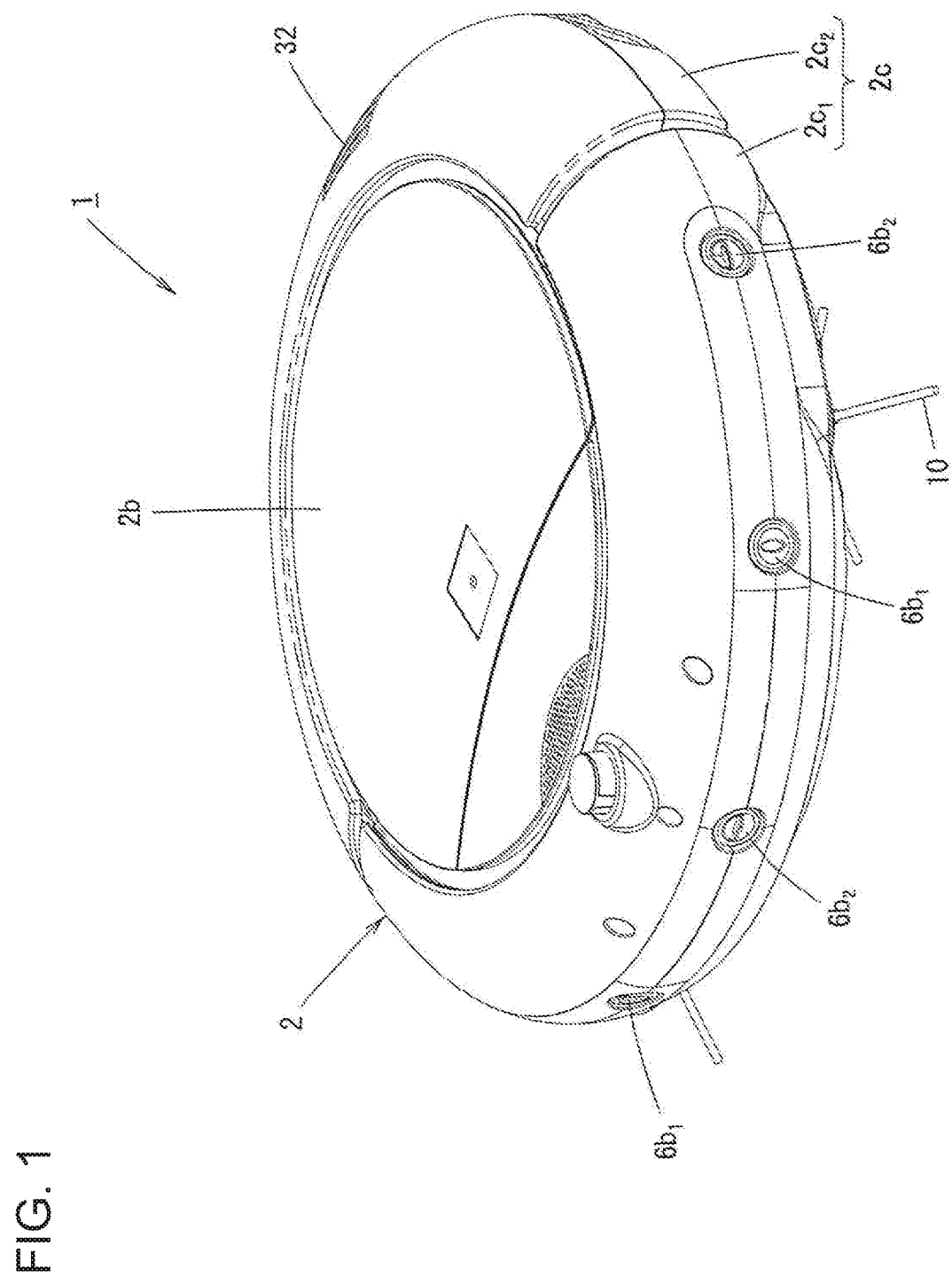
FIG. 1 is a perspective view showing a self-propelled vacuum cleaner according to a first embodiment of the present invention.
Figure 2:
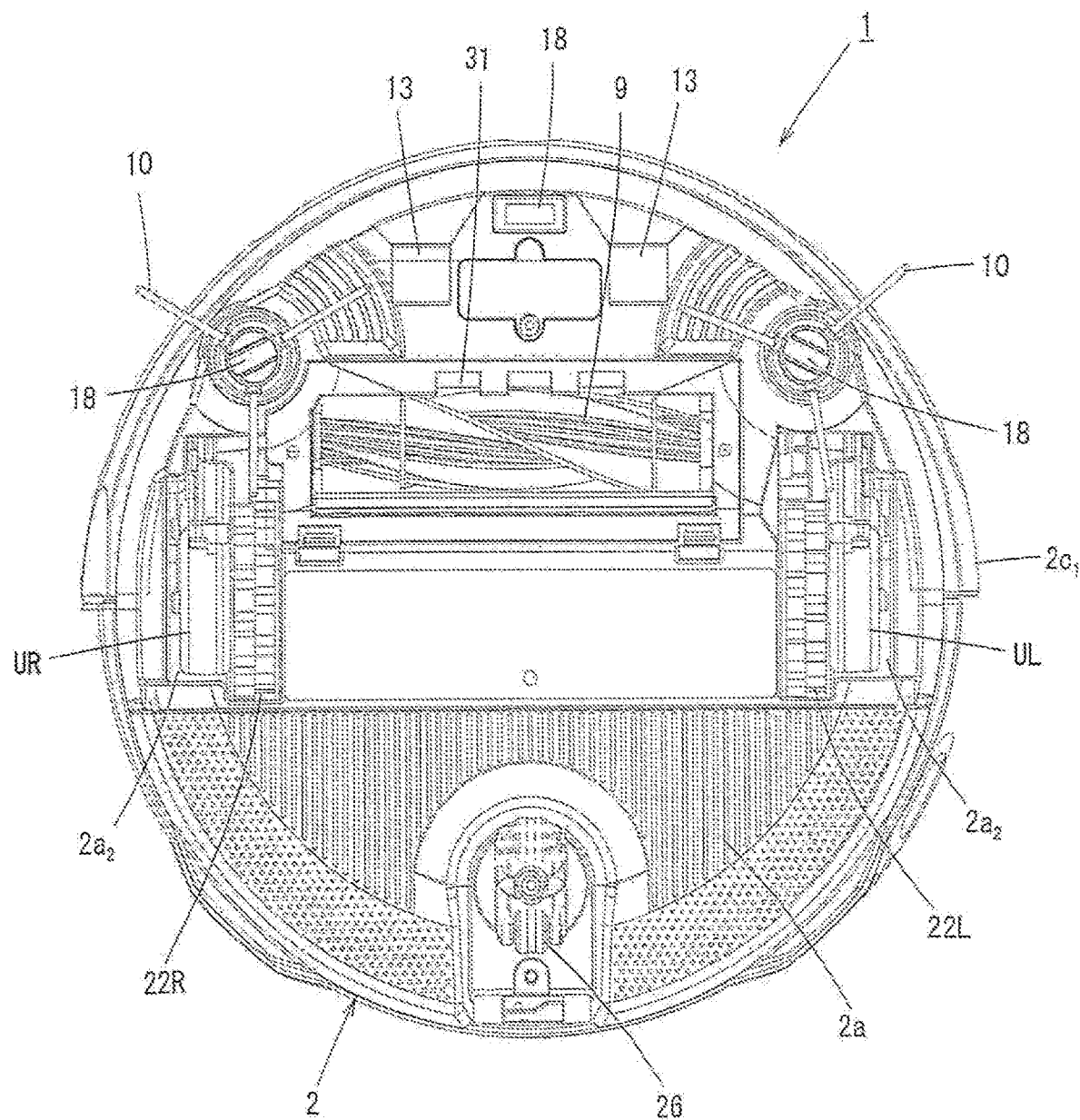
FIG. 2 is a bottom view of the self-propelled vacuum cleaner shown in FIG. 1.
Figure 3:
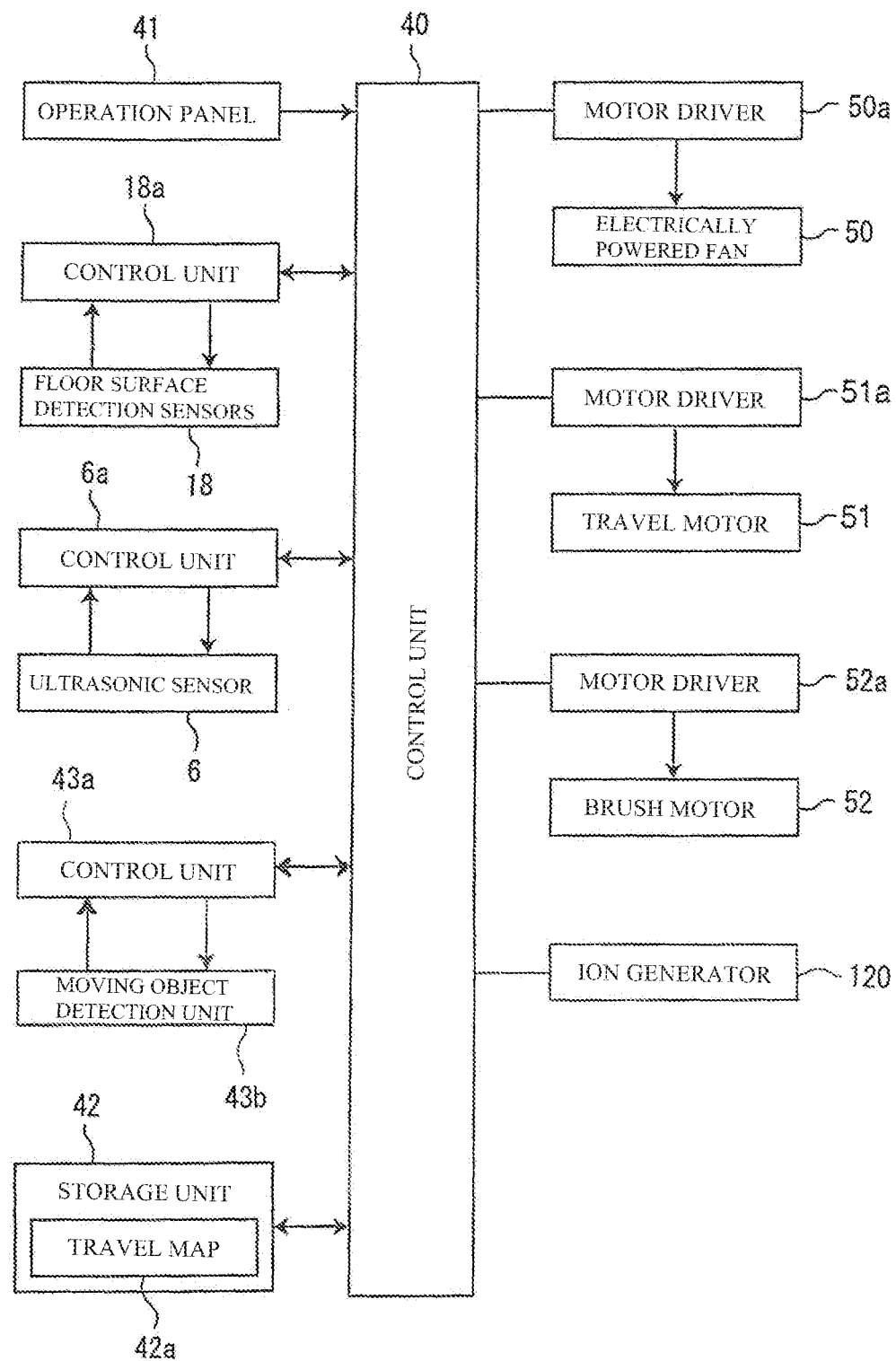
FIG. 3 is a block diagram showing a schematic configuration of a control circuit of the self-propelled vacuum cleaner shown in FIG. 1.
Figure 4:
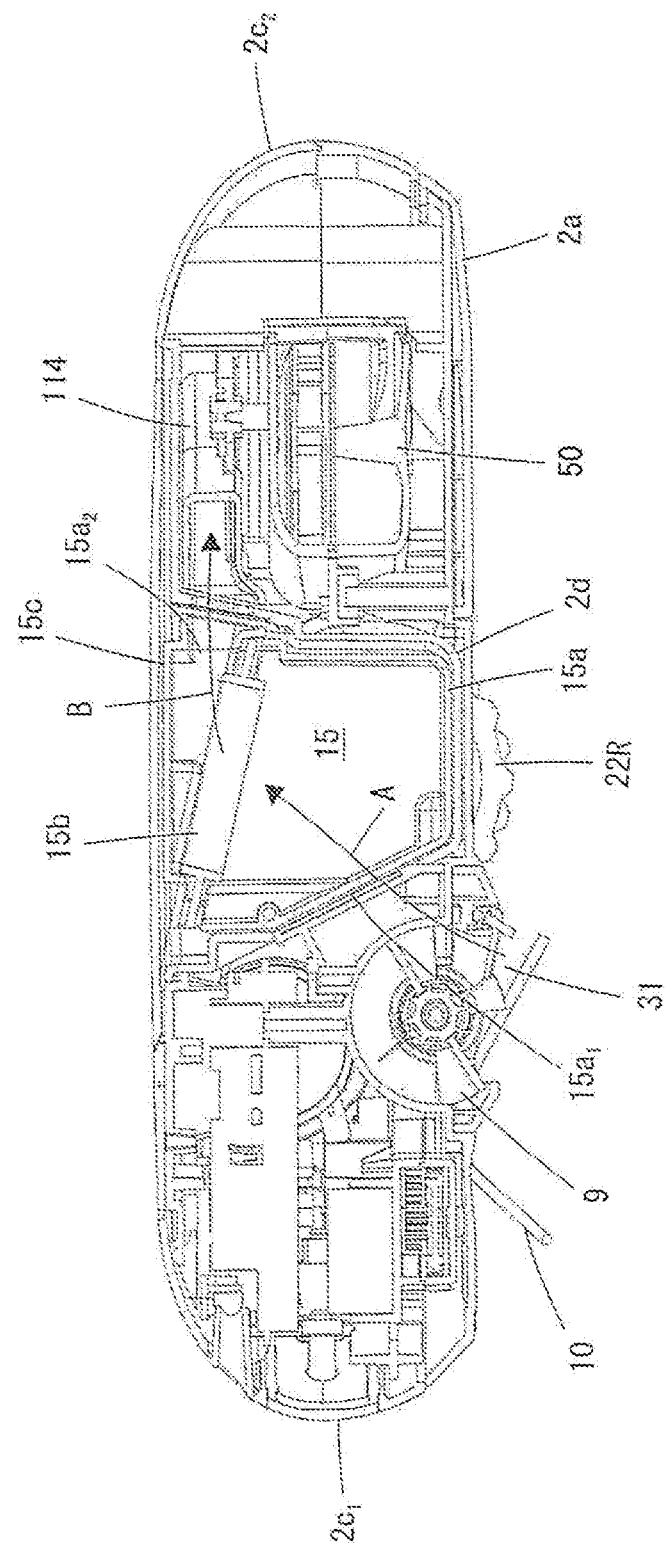
FIG. 4 is a sectional side view of the self-propelled vacuum cleaner shown in FIG. 1.
Figure 5:
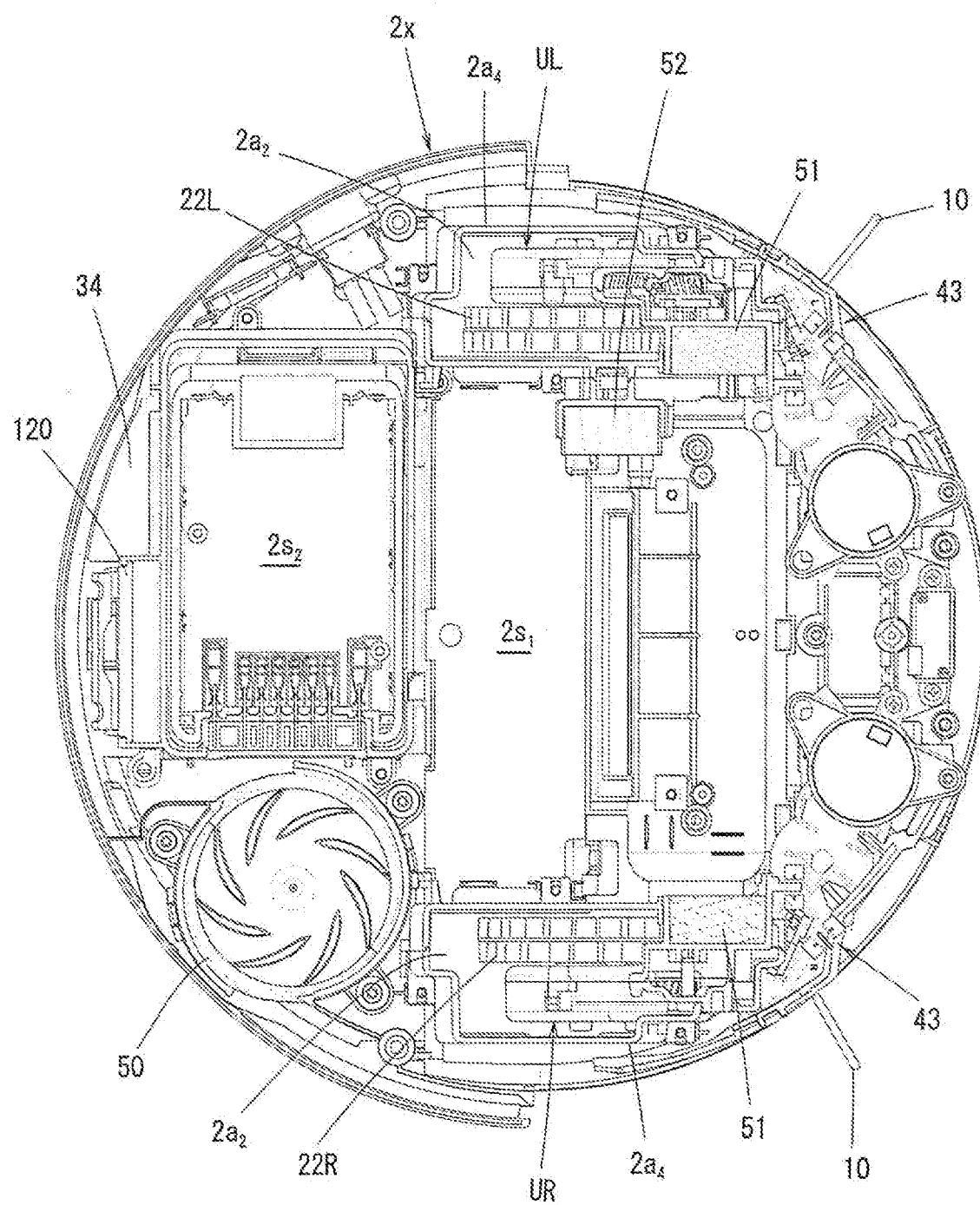
FIG. 5 is a sectional plan view of the self-propelled vacuum cleaner shown in FIG. 1.
Figure 6:
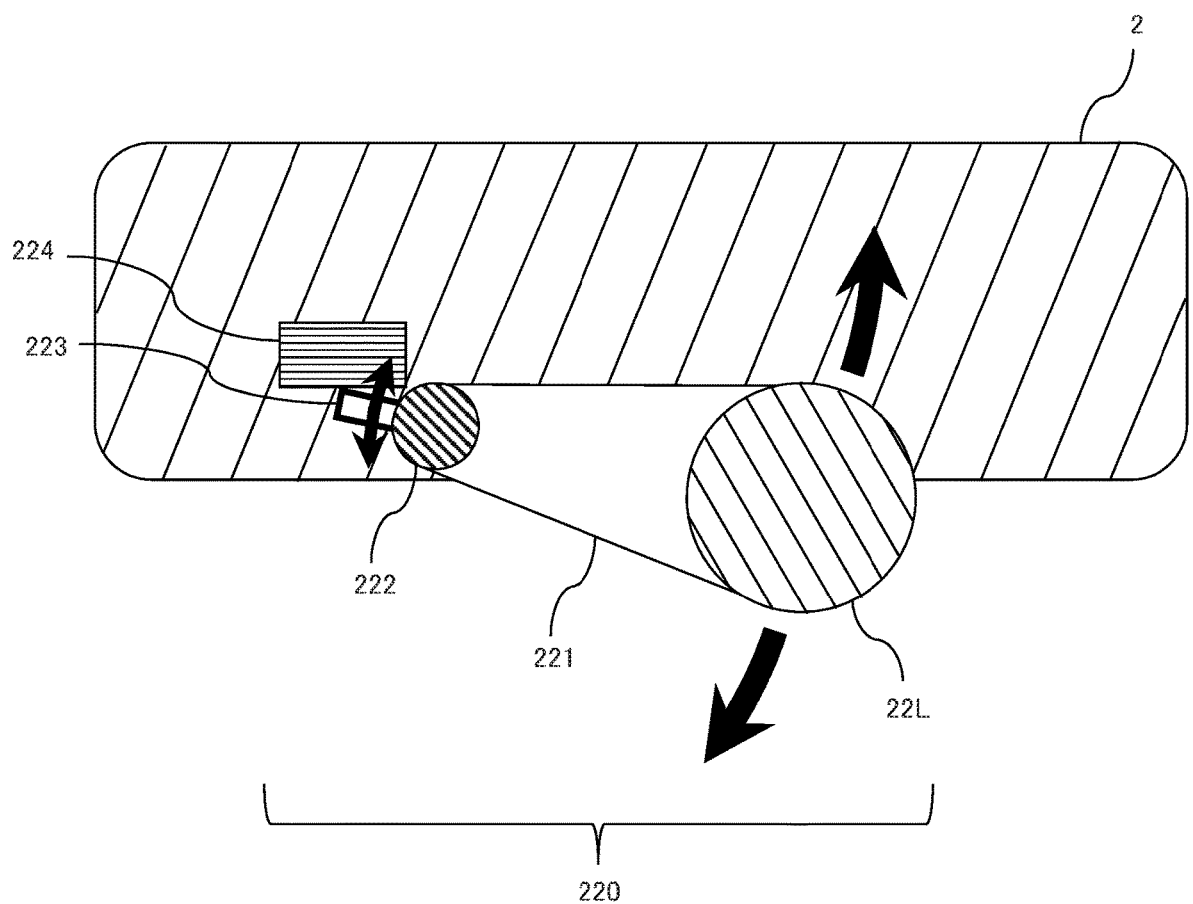
FIG. 6 is an explanatory view showing a schematic configuration of a wheel drop sensor of the self-propelled vacuum cleaner shown in FIG. 1 for detecting loss of contact of a drive wheel with a floor surface.

FIG. 1 is a perspective view of the self-propelled vacuum cleaner 1 according to the first embodiment of the present invention. FIG. 2 is a bottom view of the self-propelled vacuum cleaner 1 shown in FIG. 1. FIG. 3 is a block diagram showing a schematic configuration of a control circuit of the self-propelled vacuum cleaner 1 shown in FIG. 1. FIG. 4 is a sectional side view of the self-propelled vacuum cleaner 1 shown in FIG. 1. FIG. 5 is a sectional plan view of the self-propelled vacuum cleaner 1 shown in FIG. 1. FIG. 6 is an explanatory view showing a schematic configuration of a wheel drop sensor 220 for detecting loss of contact, of a drive wheel 22L of the self-propelled vacuum cleaner 1 shown in FIG. 1 with a floor surface.

The self-propelled vacuum cleaner 1 according to the first embodiment has a disc-shaped housing 2, and includes, inside and outside of the housing 2, components such as a collision detection unit 43, a rotary brush 9, side brushes 10, a dust-collecting box 15a composing a dust-collecting chamber 15, an electrically powered fan 50, a pair of left and right drive wheels 22L and 22R that enables the housing 2 to linearly move forward or backward and to turn in the clockwise direction or in the counterclockwise direction, a rear wheel 26, a pair of left and right charging terminals 13, a control unit 40 including a plurality of floor surface detection sensors 18, electronic device components, and the like, and a battery serving as a drive source for driving the drive wheels 22L and 22R, the rotary brush 9, the side brushes 10, the electrically powered fan 50, and the like.

In the self-propelled vacuum cleaner 1, the part where the rear wheel 26 is mounted is a rear part, a part opposite to the rear wheel 26 is a front part, and a part where the pair of left and right drive wheels 22L and 22R is mounted is an intermediate part. When the self-propelled vacuum cleaner 1 is stopped or is traveling on a horizontal surface, the housing 2 is supported by three wheels which are the pair of left and right drive wheels 22L and 22R and the rear wheel 26. Therefore, in the present specification, a direction of forward movement (frontward) indicates a direction in which the self-propelled vacuum cleaner 1 moves to the front side, a direction of backward movement (rearward) indicates a direction in which the self-propelled vacuum cleaner 1 moves to the rear side, left and right sides indicate a left side and a right side when the self-propelled vacuum cleaner 1 moves forward, and top and bottom sides indicate a top side and a bottom side in a state where the housing 2 is supported by three wheels on a floor surface FL.

The housing 2 has a bottom plate 2a which is circular in a plan view and is provided with a suction opening 31 formed on the front part at a position near the boundary between the front part and the intermediate part, a top plate 2b having a lid which is opened and closed for loading and unloading the dust-collecting box 15a to and from the housing 2, and a side plate 2c which, is annular in a plan view and formed along the outer peripheries of the bottom plate 2a and the top plate 2b.

The bottom plate 2a is formed with a pair of left and right openings $2a_2$ for storing a portion of each of the left and right drive wheels 22L and 22R in the housing 2. In addition, a support member $2a_4$ is provided around each of the openings $2a_2$ on the inner surface of the bottom plate 2a. Moreover, drive wheels 22L and 22R are respectively built in drive wheel units UL and UR provided with later-described travel motors 51 and drive force transmission mechanisms with gears for transmitting rotational drive force of the travel motors 51 to the respective drive wheels 22L and 22R. The drive wheel units UL and UR are pivotally supported by the support members $2a_4$ through a horizontal axis.

The side plate 2c is configured to be divided into two, a front bumper $2c_1$ and a rear side plate $2c_2$. The rear side plate $2c_2$ is formed with an exhaust opening 32. Hereinafter, the part of the housing 2 except for the bumper $2c_1$ is referred to as a housing main body 2x.

Inside the housing 2, components such as the travel motors 51, a brush motor 52, the electrically powered fan 50, an ion generator 120, the dust-collecting box 15a, the control circuit, and the battery are provided. The center of gravity position of the housing 2 is placed on the rear part such that the housing 2 can be supported by three wheels which are the pair of left and right drive wheels 22L and 22R and the rear wheel 26. Note that, in FIG. 5, an intermediate space $2s_1$ in the housing 2 is for storing the dust-collecting box 15a, and a rear space $2s_2$ is for storing the battery.

As shown in FIG. 3, the control circuit which performs an operation control for the entire self-propelled vacuum cleaner 1 includes the control unit 40, an operation panel 41 allowing a user to input setting conditions or operation commands pertaining to the operation of the self-propelled vacuum cleaner 1, a storage unit 42 storing a travel map 42a, a motor driver 50a for driving the electrically powered fern 50, a motor driver 51a for driving the travel motors 51 for the drive wheels 22L and 22R, a motor driver 52a for driving the brush motor 52 that drives the rotary brash 9 and the side brushes 10, a control unit 18a that controls the floor surface detection sensors 18, a control unit 6a that controls a later-described ultrasonic sensor 6, a control unit 43a that controls a later-described moving object detection unit 43b, and the like.

The control unit 40 is provided with a microcomputer including a CPU, a ROM, and a RAM, and transmits a control signal individually to the motor drivers 50a, 51a, and 52a on the basis of program data stored in advance in the storage unit 42 to perform a drive control of the electrically powered fan 50, the travel motors 51, and the brush motor 52, thereby performing a sequence of cleaning operations. The program data includes program data for a normal, mode for cleaning a wide region on the floor surface FL and program data for a wall mode for cleaning along a wall.

In addition, the control unit 40 receives a setting condition and an operation command input by the user through the operation panel 41, and causes the storage unit 42 to store die received result. The travel map 42a stored in the storage unit 42 is information pertaining to travel of the self-propelled vacuum cleaner 1, such as a travel course around the place where the self-propelled vacuum cleaner 1 is installed and a travel speed. The travel map 42a can be stored in the storage unit 42 in advance by the user or can be automatically recorded by the self-propelled vacuum cleaner 1 by oneself during the cleaning operation.

Further, when the self-propelled vacuum cleaner 1 detects an obstacle on the travel course by ultrasonic wave transmitting units $6b_1$ and ultrasonic wave receiving units $6b_2$ shown in FIG. 1 which constitute the ultrasonic sensor 6 or when the self-propelled vacuum cleaner 1 reaches the end of a region to be cleaned, the drive wheels 22L and 22R temporarily stop, and then, the left and right drive wheels 22L and 22R rotate in opposite directions to change the direction. Thus, the self-propelled vacuum cleaner 1 can autonomously travel and perform a cleaning operation around an entire place where it is installed or an entire desired range, while avoiding an obstacle.

When an obstacle is detected in the traveling direction by the ultrasonic sensor 6, the detection signal is transmitted to the control unit 40, and the control unit 40 controls such that the self-propelled vacuum cleaner 1 is stopped or changes the direction.

On the other hand, when an obstacle is not detected by the ultrasonic sensor 6 while the self-propelled vacuum cleaner 1 is traveling, the bumper $2c_1$ collides against the obstacle. When the moving object detection unit 43b detects that the bumper $2c_1$ collides against the obstacle, the detection signal is transmitted to the control unit 40, and the control unit 40 controls such that the self-propelled vacuum cleaner 1 is stopped or changes the direction.

The floor surface detection sensors 18 for detecting the floor surface FL are mounted on the center position on the front part and the positions of the left and right side brushes 10 on the bottom plate 2a of the housing 2 shown in FIG. 2 as described above. Therefore, when the floor surface detection sensors 18 detect a downward level difference DL, the detection signal is transmitted to the control unit 40 described later, and the control unit 40 controls such that the drive wheels 22L and 22R are both stopped. Thus, the self-propelled vacuum cleaner 1 is prevented from falling down the downward level difference DL. In addition, the control unit 40 may control such that, when the floor surface detection sensors 18 detect the downward level difference DL, the self-propelled vacuum cleaner 1 travels while avoiding the downward level difference DL.

A pair of left and right charging terminals 13 for charging the built-in battery is provided on the front end of the bottom plate 2a of the housing 2. The self-propelled vacuum cleaner 1 which performs a cleaning operation while autonomously traveling around a room returns to a charging station installed in the room after finishing the cleaning operation.

Specifically, the self-propelled vacuum cleaner 1 recognizes the direction where the charging station installed on the floor surface FL is present by detecting, for example, an infrared signal transmitted from the charging station, and autonomously travels, while avoiding an obstacle, to return to the charging station.

Accordingly, the charging terminals 13 on the self-propelled vacuum cleaner 1 are brought into contact with a power supply terminal section provided to the charging station, and the power supply terminal section is connected to a positive-electrode terminal and a negative-electrode terminal of the battery through the charging terminals 13. Thus, the battery is charged.

Note that, basically, the self-propelled vacuum cleaner 1 do not automatically operate but in a stand-by state, when it is charged.

Moreover, the charging station connected to a commercial power supply (socket) is generally installed in a room along a sidewall. The battery supplies electric power to drive control elements such as various motors and the control circuit.

As described above, the self-propelled vacuum cleaner 1 is in contact with the floor surface FL on three points which are the left and right drive wheels 22L and 22R and the rear wheel 26, and the weight of the self-propelled vacuum cleaner 1 is distributed in such a balance that loss of contact of the rear wheel 26 with the floor surface FL is prevented even when the self-propelled vacuum cleaner 1 suddenly stops while moving forward.

Therefore, even when suddenly stopping in front of the downward level difference DL while moving forward, the self-propelled vacuum cleaner 1 is prevented from falling down the downward level difference DL by leaning forward due to the sudden stop. Notably, each of the drive wheels 22L and 22R is formed by inserting, into a wheel, a rubber tire which has a tread pattern (groove) formed on a contact area to prevent the drive wheels 22L and 22R from slipping even when the self-propelled vacuum cleaner 1 suddenly stops.

The suction opening 31 is a recessed open surface formed on the bottom surface (lower surface of the bottom plate 2a) of the housing 2 so as to face the floor surface FL. The rotary brush 9 rotating around a horizontal axis parallel to the bottom surface of the housing 2 is provided in the recess, and the side brushes 10 rotating around an axis perpendicular to the bottom surface of the housing 2 are provided on both the left and right sides of the recess. The rotary brush 9 is formed of brushes erected in a spiral manner on the outer peripheral surface of a roller serving as a rotary shaft. Each of the side brushes 10 is formed by providing brush bundles in a radial manner on the lower end of a rotary shaft. The rotary shaft of the rotary brash 9 and the rotary shafts of the pair of side brushes 10 are pivotally supported to a portion of the bottom plate 2a of the housing 2, and connected so as to be rotatable to the brush motor 52 provided in the vicinity thereof through a power transmission mechanism including a pulley and a belt.

In the housing 2, a suction path is formed between the suction opening 31 and the dust-collecting box 15a, and an exhaust path is formed between the dust-collecting box 15a and the exhaust opening 32.

As shown in FIG. 4, air containing dust suctioned into the housing 2 through the suction opening 31 is guided into the dust-collecting box 15a through the suction path and a suction opening $15a_1$ of the dust-collecting box 15a as indicated by an arrow A. At that time, the rotary brush 9 rotates to sweep up dust on the floor surface FL into the suction opening 31, and the pair of side brushes 10 rotates to collect dust present on the right and left of the suction opening 31 into the suction opening 31.

After dust is collected in the dust-collecting box 15a, air from which dust is removed through the filter 15b is discharged to the outside from the exhaust opening 32 through a discharge opening $15a_2$ of the dust-collecting box 15a, a duct 114 connected to the discharge opening $15a_2$, and the electrically powered fan 50 and the exhaust path 34 connected to the duct 114, as indicated by an arrow B. Note that, in FIG. 4, a cover 15c of the dust-collecting box 15a covers the filter 15b.

The self-propelled, vacuum cleaner 1 moves forward by forward rotations of the left and right drive wheels 22L and 22R in the same direction, moves backward by reverse rotations in the same direction, and turns when the left and right drive wheels 22L and 22R rotate in opposite directions. For example, when reaching the end of the region to be cleaned or when colliding against an obstacle on a travel course, the self-propelled vacuum cleaner 1 stops the drive wheels 22L and 22R, and then, rotates the left and right drive wheels 22L and 22R by amounts of rotation different from each other to change the direction. Thus, the self-propelled vacuum cleaner 1 can autonomously travel around a place where it is installed or an entire desired region, while efficiently avoiding an obstacle.

<Bumper $2c_1$, Collision Detection Unit 43, and Configuration Around Bumper $2c_1$ And Collision Detection Unit 43>

As shown in FIG. 1, the semicircular bumper $2c_1$ has circular holes formed on the central position in the circumferential direction and on a plurality of positions on each the left and right sides of the central position, and ultrasonic wave transmitting units $6b_1$ and ultrasonic wave receiving units $6b_2$ of the ultrasonic sensor 6 are provided on the inner surface of the bumper $2c_1$ so as to be exposed from the respective holes. In the first embodiment, five holes are formed on the bumper $2c_1$ in line. The ultrasonic wave receiving units $6b_2$ are disposed in the holes on the central position and on both left and right ends, and the ultrasonic wave transmitting units $6b_1$ axe disposed in two holes adjacent to the central position.

A control unit 6a (FIG. 3) causes the ultrasonic wave transmitting unit $6b_1$ of the ultrasonic sensor 6 to emit an ultrasonic wave, calculates the distance to an obstacle on the basis of a time from when the transmitted ultrasonic wave is reflected on the obstacle till the reflected wave is received by the ultrasonic wave receiving unit $6b_2$, and transmits the calculated distance to the control unit 40 as a detection signal.

The bumper $2c_1$ is fitted to the peripheral edge of a front opening $2x_1$ of the housing main body 2x constituted by the ends of the bottom plate 2a, the top plate 2b, and the rear side plate so as to cover the front opening $2x_1$. In this case, the bumper $2c_1$ is supported by a fitting structure which Is movable in the front-rear direction and in the left-right direction relative to the housing main body 2x and does not fall from the front opening $2x_1$.

<Wheel Drop Sensor 220>

Next, the wheel drop sensor 220 according to the present invention will be described with reference to FIGS. 6 to 8.

FIG. 6 is an explanatory view showing the schematic configuration of the wheel drop sensor 220 for detecting loss of contact of the drive wheel 22L of the self-propelled vacuum cleaner 1 shown in FIG. 1 with the floor surface.

FIG. 7 is an explanatory view showing a state of the drive wheel 22L shown in FIG. 6 under a situation where the drive wheel 22L is in contact with the floor surface (FIG. 7(A)) and a situation where the drive wheel 22L loses contact with the floor surface (FIG. 7(B)).

Figure 8A:
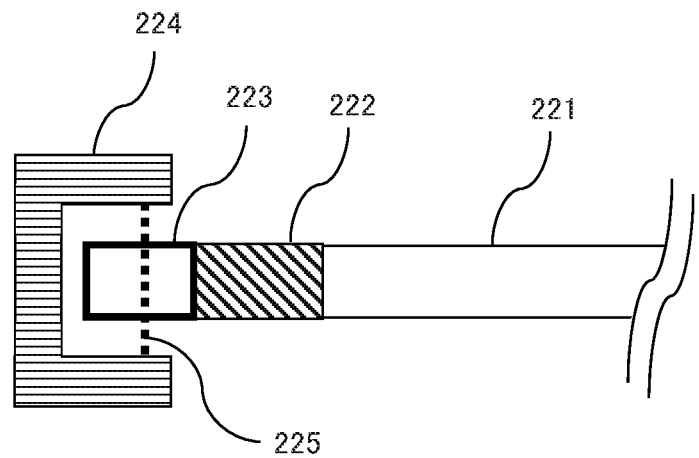
FIG. 8 is an explanatory view showing a state of the wheel drop sensor shown in FIG. 6 under a situation where the drive wheel is in contact with the floor surface (FIG. 8(A)) and a situation where the drive wheel loses contact with the floor surface (FIG. 8(B)).
Figure 8B:
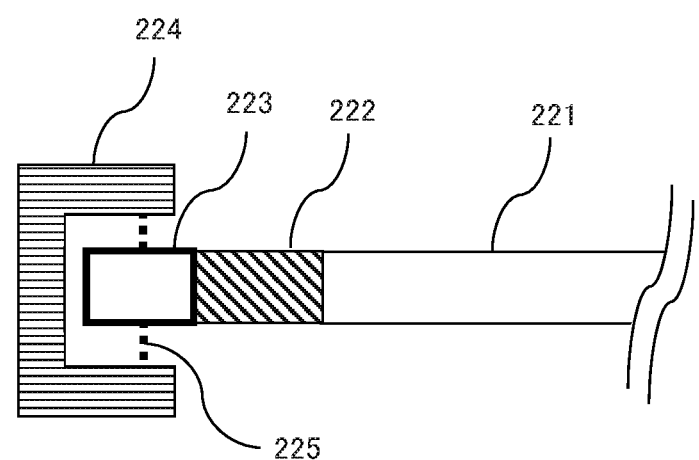

FIG. 8 is an explanatory view showing a state of the wheel drop sensor 220 shown in FIG. 6 under a situation where the drive wheel 22L is in contact with the floor surface (FIG. 8(A)) and a situation where the drive wheel 22L loses contact with the floor surface (FIG. 8(B)).

As shown in FIG. 6, the wheel drop sensor 220 according to the present invention is implemented by cooperation among the drive wheel 22L, a support arm 221, a rotation support shaft 222, a slit 223, and an optical sensor 224.

The drive wheel 22L is supported so as to be vertically pivotable around the rotation support shaft 222 through the support arm 221.

The slit 223 is provided on one end of the rotation support shaft 222 opposite to the support arm 221 in such a manner that the slit 223 is freely inserted into the optical sensor 224 according to the pivot movement of the rotation support shaft 222.

As shown in FIG. 7(A), when the drive wheel 22L is in contact with the ground, the housing 2 pushes the floor surface FL under the weight of the main body of the self-propelled vacuum cleaner 1. Therefore, the drive wheel 22L pivots upward relative to the housing 2.

At that time, as shown in FIG. 8(A), the slit 223 pivots downward in conjunction with the upward pivot: movement of the support arm 221, so that the slit 223 moves to a position where the slit 223 does not interfere with an optical signal 225 in the optical sensor 224.

On the other hand, as shown in FIG. 7(B), when the main body is carried and the drive wheel 22L is separated from the ground, the drive wheel 22L is pulled downward by the weight of the drive wheel 22L itself, so that the drive wheel 22L pivots downward relative to the housing 2.

At that time, as shown, in. FIG. 8(B), the slit 223 pivots upward in conjunction with the downward pivot movement of the support arm 221, so that the slit 223 moves to a position where the slit 223 interferes with the optical signal 225 in the optical sensor 224.

In this way, whether or not the drive wheel 22L is separated from the floor surface FL, that is, whether or not loss of contact of the drive wheel 22L with the floor surface FL occurs, can be determined on the basis of whether or not the slit 223 interferes with the optical signal 225.

The above is an example for the drive wheel 22L. However, the same is applied to the drive wheel 22R. In addition, because the wheel drop sensor 220 is independently provided to the drive wheels 22L and 22R, a wheel drop condition of one of the drive wheels 22L and 22R can be detected.

The example shown in FIGS. 6 to 8 is only illustrative, and various combinations between the drive wheel 22L and the slit 223 are conceivable. In place of the combination of the slit and the optical sensor, a physical switch such as a tactile switch using a spring may be used. Therefore, it should not be construed that the present invention is limited by the example shown in FIGS. 6 to 8.

<Example where Drive Wheel 22L (22R) Loses Contact with Floor Surface>

Next, an example where the drive wheel 22L (22R) of the self-propelled vacuum cleaner 1 according to the present invention loses contact with the floor surface will be described with reference to FIGS. 9(A) to 9(C).

FIG. 9 is an explanatory view showing an example where the drive wheel 22L (22R) of the self-propelled vacuum cleaner 1 shown in FIG. 1 loses contact with the floor surface.

Figure 9A:
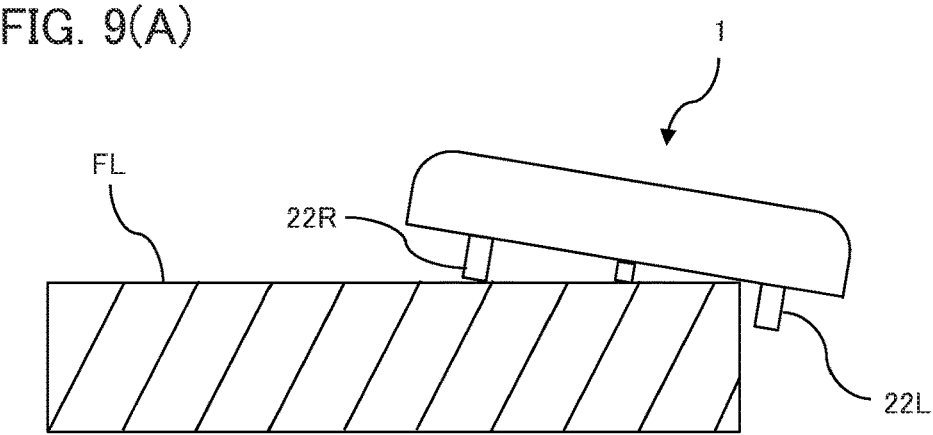
FIG. 9 is an explanatory view showing an example where the drive wheel of the self-propelled vacuum cleaner shown in FIG. 1 loses contact with the floor surface.

FIG. 9(A) shows a situation where the drive wheel 22L of the self-propelled vacuum cleaner 1 drops off from the end of the floor surface FL.

This state occurs in an environment where the main body of the self-propelled vacuum cleaner 1 is likely to fall, such as at a footstep in an entrance, for example.

As described above, the floor detection sensors 18 for detecting the floor surface FL are mounted on the center position on the front part and the positions of the left and right side brushes 10 on the bottom plate 2a of the housing 2. Therefore, the cleaner 1 does not fall on the front side, the front left side, or the front right side of the housing 2, However, the state shown in FIG. 9(A) may occur when the self-propelled vacuum cleaner 1 moves backward while making a curve from the rear right or from the rear left to reach the end of the floor surface FL.

Figure 9B:
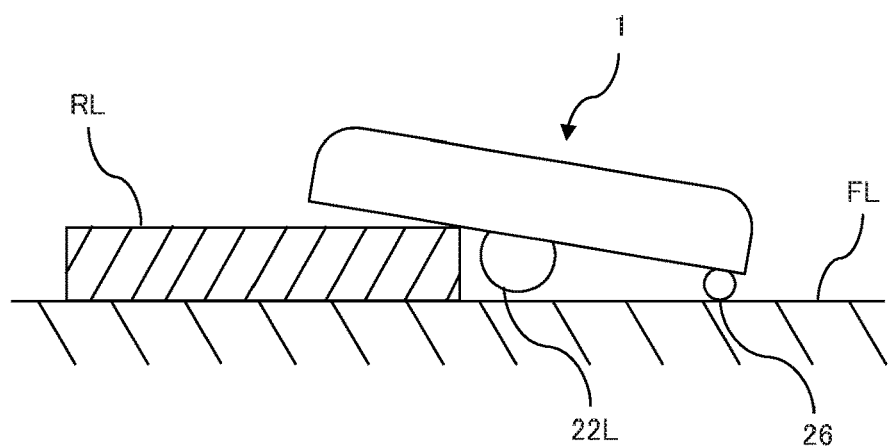

FIG. 9(B) shows a situation where the drive wheel 22L (22R) loses contact with the floor surface FL due to a climbing action of the self-propelled vacuum cleaner 1 onto the upward level difference RL.

As shown in FIG. 9(B), the front part of the lower surface of the housing 2 climbs onto the upward level difference RL, and the main body of the self-propelled vacuum cleaner 1 is supported by the lower surface of the housing 2 and the rear wheel 26. At that time, the drive wheel 22L (22R) is slightly in contact with the floor surface or not in contact with the floor surface.

This state occurs in an environment where the drive wheel 22L (22R) of the self-propelled vacuum cleaner 1 is likely to lose contact with the floor surface, such as on a threshold in a Japanese room or on a doorsill. When the self-propelled vacuum cleaner 1 tries to climb over the upward level difference RL, the whole self-propelled vacuum cleaner 1 including the main body may lose contact with the floor surface due to an impact upon collision between the drive wheel 22L (22R) and the upward level difference RL. When the self-propelled vacuum cleaner 1 tries to climb over the upward level difference RL with this state, the drive wheel 22L (22R) slips without being engaged with the upward level difference RL and loses contact with the upward level difference RL. Therefore, the drive wheel 22L (22R) may stop the rotation.

FIG. 9(B) shows an example where the self-propelled vacuum cleaner 1 climbs onto the upward level difference RL from front. However, if the self-propelled vacuum cleaner 1 obliquely plunges to the upward level difference RL, only one of the drive wheels 22L and 22R may climb onto the upward level difference RL.

Figure 9C:
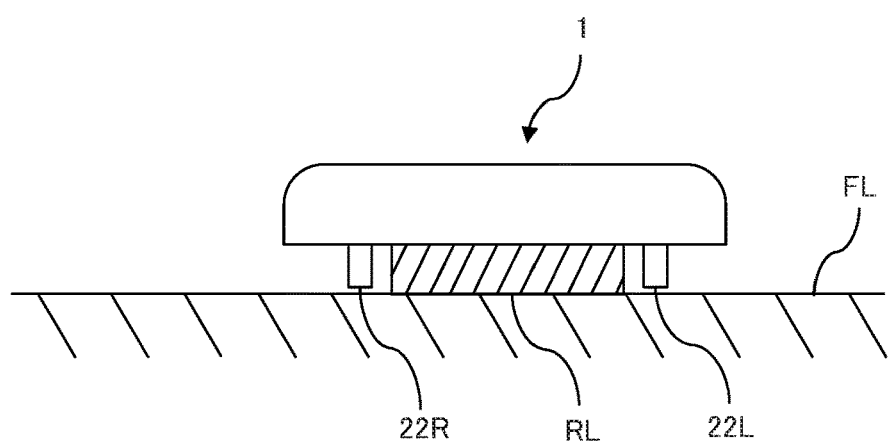

Further, as shown in FIG. 9(C), when the main body of the self-propelled vacuum cleaner 1 travels such that the upward level difference RL is held between the left and right drive wheels 22L and 22R, the main body may climb onto the upward level difference RL. At that time, loss of contact of the drive wheels 22L and 22R occurs. Therefore, even when the drive wheels 22L and 22R are driven, they slip, so that the self-propelled vacuum cleaner 1 may stop.

Just after loss of contact of the drive wheel 22L (22R) occurs due to the collision between the drive wheel 22L (22R) and the upward level difference RL, the drive wheel 22L (22R) may sometimes run idle with the tread pattern (groove) formed on the contact area of the drive wheel 22L (22R) being engaged with the upward level difference RL. In this case as well, the loss of contact of the drive wheel 22L (22R) continues.

As described above, loss of contact of the drive wheel 22L (22R) with the floor surface may occur not only in the situation (FIG. 9(A)) where the drive wheel 22L (22R) drops off from the floor surface FL on the downward level difference DL but also in die situation (FIG. 9(B)) where the drive wheel 22L (22R) climbs onto the upward level difference RL due to an impact upon collision against the upward level difference RL or in the situation (FIG. 9(C)) where the main body of the self-propelled vacuum cleaner 1 climbs onto the upward level difference RL.

On the other hand, the wheel drop sensor 220 detects only loss of contact of the drive wheel 22L (22R) with the floor surface. Therefore, the self-propelled vacuum cleaner 1 cannot determine at all whether the detected loss of contact of the drive wheel 22L (22R) with the floor surface is caused due to the downward level difference DL as shown in FIG. 9(A) or caused when, the self-propelled vacuum cleaner 1 tries to climb over the upward level difference RL as shown in FIGS. 9(B) and 9(C).

It is not preferable to stop the drive wheel 22L (22R) when loss of contact of the drive wheel 22L (22R) with the floor surface occurs due to a climbing action of the self-propelled vacuum cleaner 1 onto the upward level difference RL as shown in FIGS. 9(B) and 9(C). This is because. If the self-propelled vacuum cleaner 1 stops or transfers to the escaping operation every approach to the upward level difference RL, it cannot climb over the upward level difference RL, and therefore, the function of the self-propelled vacuum cleaner 1 may not sufficiently work.

On the other hand, when the self-propelled vacuum cleaner 1 continues to travel without stopping the drive wheel 22L (22R) under the situation where loss of contact of the drive wheel 22L (22R) with the floor surface occurs because the self-propelled vacuum cleaner 1 drops off from the floor surface FL on the downward level difference DL as shown in FIG. 9(A), the main body may fail.

As described above, in the self-propelled vacuum cleaner 1, there is a trade-off between the function of climbing over the upward level difference RL and the function of preventing the cleaner from falling down the floor surface FL on the downward level difference DL.

To address the problem described above, the present invention implements the self-propelled vacuum cleaner 1 that can achieve compatibility between the function of climbing over the upward level difference RL and the function of preventing the cleaner from falling down the floor surface FL on the downward level difference DL according to the travel procedure described below.

<Travel Procedure of Self-Propelled Vacuum Cleaner 1 after Loss of Contact of Drive Wheel 22L with Floor Surface is Detected>

Next, a travel method of the self-propelled vacuum cleaner 1 after loss of contact of the drive wheel 22L with the floor surface is detected will be described with reference to FIGS. 10 and 11.

Figure 10:
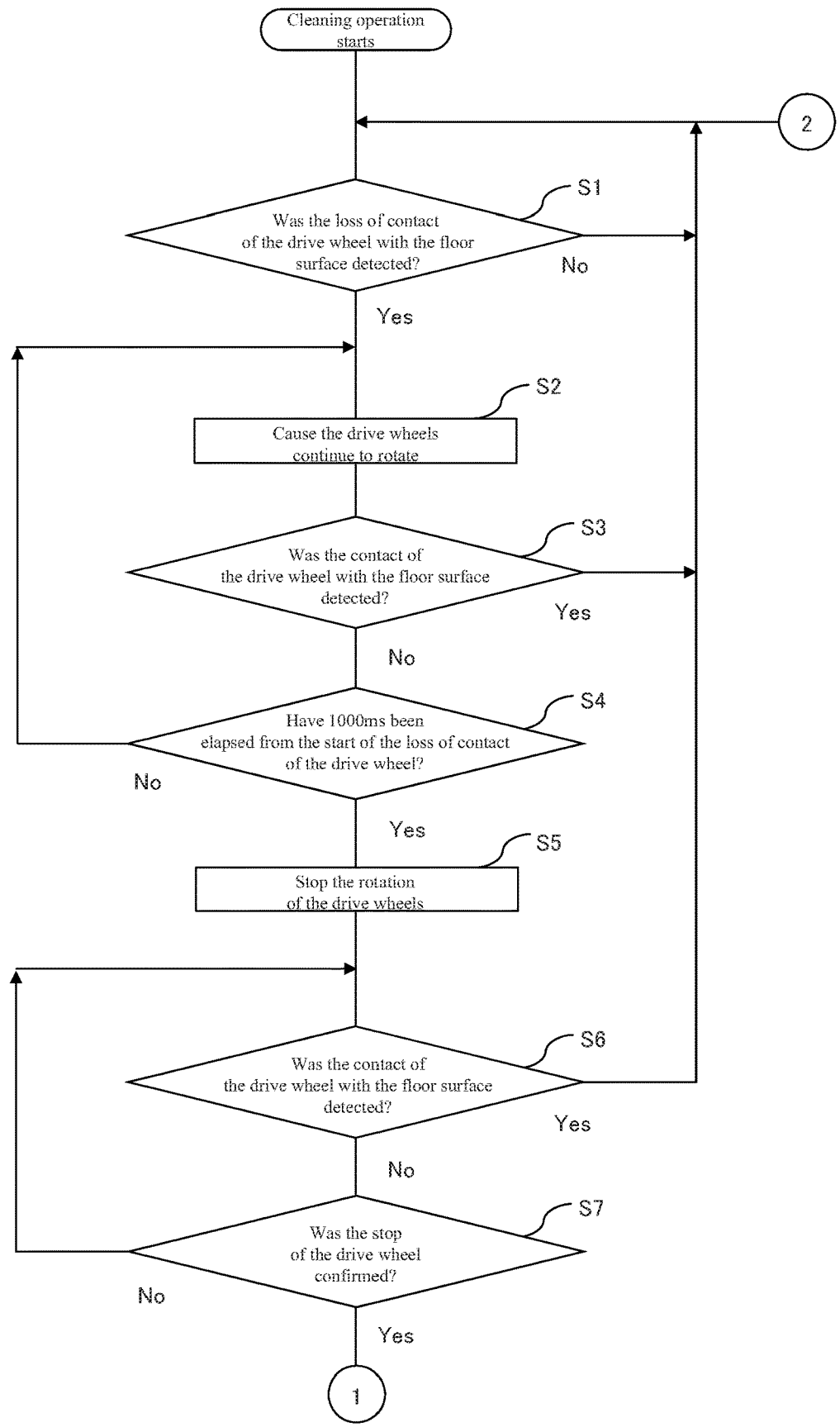
FIG. 10 is a flowchart showing a travel procedure of the self-propelled vacuum cleaner shown in FIG. 1 after loss of contact of the drive wheel with the floor surface is detected.
Figure 11:
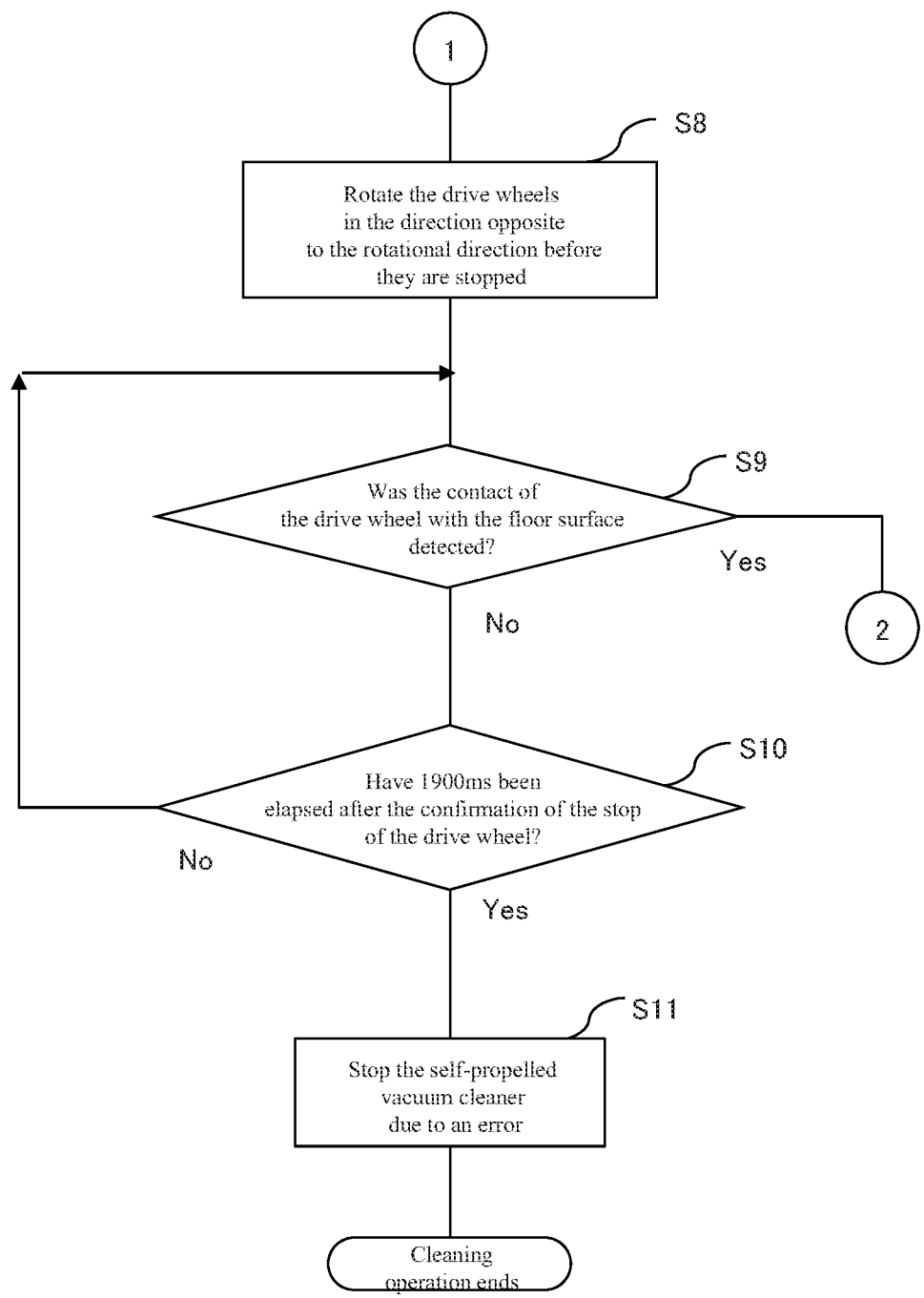
FIG. 11 is a flowchart showing a travel procedure of the self-propelled vacuum cleaner shown in FIG. 1 after loss of contact of the drive wheel with the floor surface is detected.

FIGS. 10 and 11 are flowcharts showing a travel procedure of the self-propelled vacuum cleaner 1 shown in FIG. 1 after loss of contact of the drive wheel 22L with the floor surface is detected.

Now, the case where loss of contact of the drive wheel 22L with the floor surface is detected will be described. However, it should be noted that the same is applied to the case where loss of contact, of the drive wheel 22R with the floor surface is detected.

As shown in FIG. 10, after starting the cleaning operation, the control unit 40 determines in step S1 whether or not the wheel drop sensor 220 detects loss of contact of the drive wheel 22L with the floor surface (step S1).

When the wheel drop sensor 220 detects loss of contact of the drive wheel 22L with the floor surface (Yes in step S1), the control unit 40 causes the drive wheels 22L and 22R to continue to rotate in step S2 (step S2). Thereafter, the control unit 40 makes determination in step S3.

On the other hand, when the wheel drop sensor 220 does not detect loss of contact of the drive wheel 22L with the floor surface (No in step S1), the control unit 40 repeats the determination in step S1 (step S1).

Next, in step S3, the control unit 40 determines whether or not the wheel drop sensor 220 detects contact of the drive wheel 22L with the floor surface (step S3).

When the wheel drop sensor 220 detects contact of the drive wheel 22L with the floor surface (Yes in step S3), the control unit 40 repeats the determination in step S1 (step S1).

On the other hand, when wheel drop sensor 220 does not detect contact of the drive wheel 22L with the floor surface (No in step S3), the control unit 40 makes determination in step S4 (step S4).

Next, in step S4, the control unit 40 determines whether or not 1000 msec have elapsed from the start of the loss of contact of the drive wheel 22L (step S4).

When 1000 msec have elapsed from the start of the loss of contact of the drive wheel 22L (Yes in step S4), the control unit 40 stops the rotation of the drive wheels 22L and 22R in step S5 (step S5).

Then, the control unit 40 makes determination in step S6 (step S6).

On the other hand, when 1000 msec have not elapsed from the start of the loss of contact of the drive wheel 22L in step S4 (No in step S4), the control unit 40 performs the process in step S2 (step S2).

Next, in step S6, the control unit 40 determines whether or not contact of the drive wheel 22L with the floor surface is detected (step S6).

When contact of the drive wheel 22L with the floor surface is detected (Yes in step S6), the control unit 40 repeats the determination in step S1 (step S1).

On the other hand, when contact of the drive wheel 22L with the floor surface is not detected (No in step S6), the control unit 40 makes determination in step S7 (step S7).

Next, in step S7, the control unit 40 determines whether or not the stop of the drive wheels 22L and 22R is confirmed (step S7).

When the stop of the drive wheels 22L and 22R is confirmed (Yes in step S7), the control unit 40 performs the process in step S8 in FIG. 11 (step S8).

On the other hand, when the stop of the drive wheels 22L and 22R is not confirmed (No in step S7), the control unit 40 repeats the determination in step S6 (step S6).

Next, in step S8 in FIG. 11, the control unit 40 rotates the drive wheels 22L and 22R in the direction opposite to the rotational direction before they are stopped (step S8).

Next, in step S9, the control unit 40 determines whether or not the wheel drop sensor 220 detects contact of the drive wheel 22L with the floor surface (step S9).

When the wheel drop sensor 220 detects contact of the drive wheel 22L with the floor surface (Yes in step S9), the control unit 40 repeats the determination in step S1 (step S1).

On the other hand, when the wheel drop sensor 220 does not detect contact of the drive wheel 22L with the floor surface (No in step S9), the control unit 40 makes determination in step S10 (step S10).

Next, in step S10, the control unit 40 determines whether or not. 1900 msec have elapsed after the confirmation of the stop of the drive wheel 22L (step S10).

When 1900 msec have elapsed after the confirmation of the stop of the drive wheel 22L (Yes in step S10), the control unit. 40 stops the self-propelled vacuum cleaner 1 due to an error in step S11 (step S11). Then, the control unit 40 ends the cleaning operation.

On the other hand, when 1900 msec have not elapsed after the confirmation of the stop of the drive wheel 22L (No in step S10), the control unit 40 repeats the determination in step S9 (step S9).

Note that the backward movement continuation time of 1900 msec in step S10 is merely one example, and it should be considered that this continuation time actually varies depending on the configuration of the main body.

The minimum necessary backward movement continuation time is considered to be a forward movement continuation time (1000 msec) from the detection of the loss of contact of the drive wheel 22L with the floor surface till the backward movement is started. This is because the time for the self-propelled vacuum cleaner 1 to free oneself from the forward movement and return to the position where the loss of contact is detected is needed.

In addition, in this case, the conceivable situations where loss of contact of the drive wheel 22L with the floor surface occurs include a situation where the housing 2 climbs onto the upward level difference RL or onto a heap of power cords. In this case, the drive wheels 22L and 22R may slip to some extent during the backward movement. Therefore, the backward movement continuation time actually needs to be longer than the forward movement continuation time (1000 msec).

On the other hand, if the self-propelled vacuum cleaner 1 is driven for a long time when drop-off of the drive wheel 22L occurs due to the drive wheel 22L dropping off from the floor surface FL on the downward level difference DL, the self-propelled vacuum cleaner 1 may fall down the downward level difference DL.

In view of the above points, it: is necessary to finally determine the backward movement continuation time such that the self-propelled vacuum cleaner 1 can free oneself to some extent from the loss-of-contact state of the drive wheel 22L and the self-propelled vacuum cleaner 1 does not fall.

<Automatic Return Operation to the Charging Station when the Self-Propelled Vacuum Cleaner 1 Unexpectedly Moves Away from the Charging Station>

Finally, an automatic return operation of the self-propelled vacuum cleaner 1 shown in FIG. 1 to the charging station will be described with reference to FIG. 12.

Figure 12:
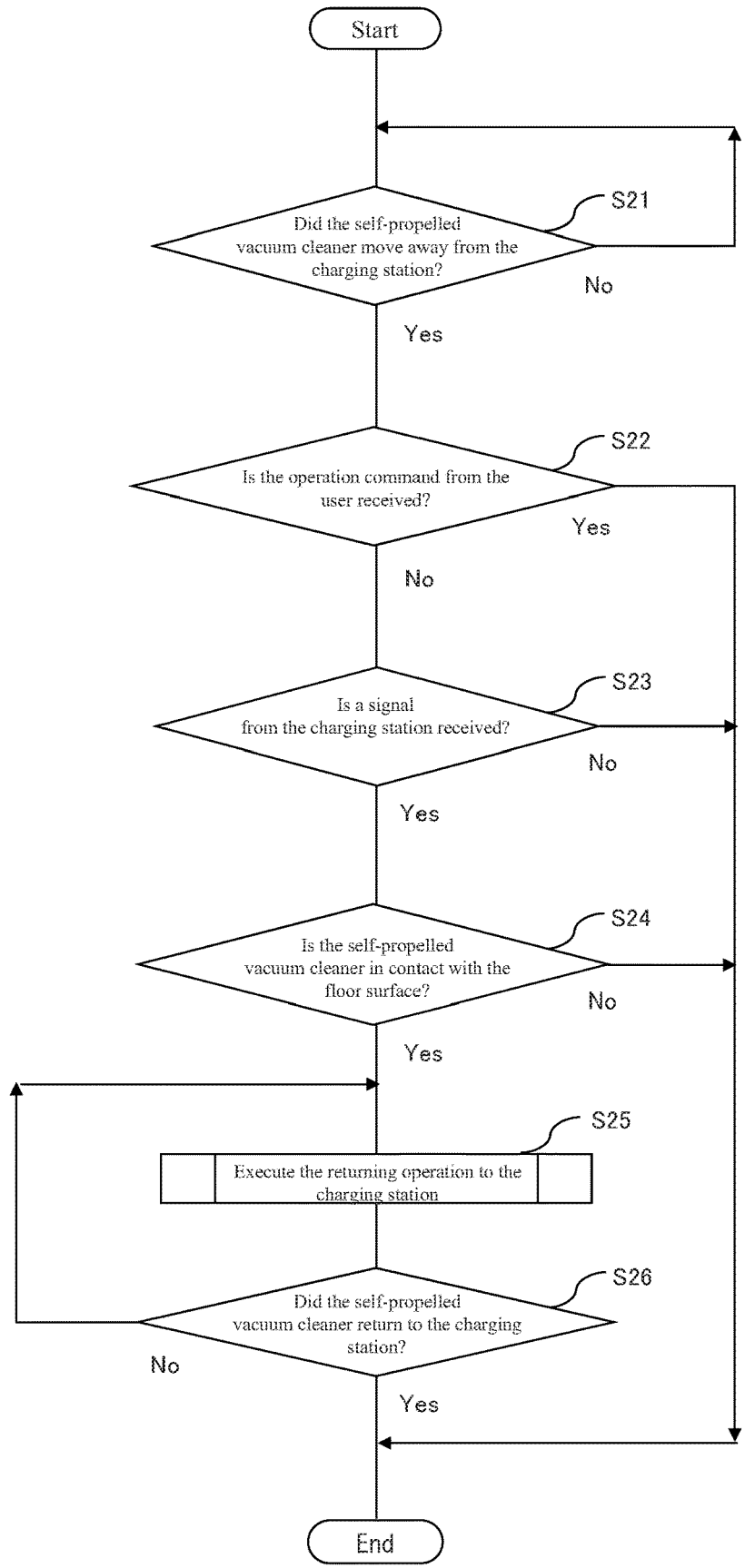
FIG. 12 is a flowchart showing a returning operation of the self-propelled vacuum cleaner shown in FIG. 1 to a charging station.

FIG. 12 is a flowchart showing the return operation of the self-propelled vacuum cleaner 1 shown in FIG. 1 to the charging station.

The self-propelled vacuum cleaner 1 unexpectedly move away from the charging station without the intention of the user.

For example, it is considered that the self-propelled vacuum cleaner 1 drops off from the charging station because the user's foot hits the self-propelled vacuum cleaner 1 or an earthquake occurs.

In such a case, it is desirable that the self-propelled vacuum cleaner 1 automatically starts the returning operation to the charging station without bothering the user.

However, when the self-propelled vacuum cleaner 1 moves away from the charging station, the control unit 40 cannot determine whether this movement occurs unexpectedly without the intension of the user or occurs according to the intention of the user who carries the self-propelled vacuum cleaner 1 by oneself to another place.

Therefore, if the user carries the self-propelled vacuum cleaner 1 by oneself when the returning operation to the charging station, which is to be started when the self-propelled vacuum cleaner 1 moves away from the charging station, is automatically started, there may be a fear of failing to ensure the safety of the user, because the drive wheels 22L and 22R, the rotary brush 9, the side brushes 10, and the electrically powered fan 50 are driven.

To address such a problem the self-propelled vacuum cleaner 1 according to the present invention performs the returning operation to the charging station according to the procedure shown in FIG. 12.

In step S21 in FIG. 12, the control unit 40 determines whether or not the self-propelled vacuum cleaner 1 moves away from the charging station (step S21).

Specifically, the control unit 40 determines whether or not the self-propelled vacuum cleaner 1 moves away from the charging station by monitoring whether or not a current from the charging station which has been detected is not detected.

When the self-propelled vacuum cleaner 1 moves away from the charging station (Yes in step S21), the control unit 40 makes determination in step S22 (step S22).

On the other hand, when the self-propelled vacuum cleaner 1 does not move away from the charging station (No in step S21), the control unit 40 repeats the determination in step S21 (step S21).

Next, in step S22, the control unit 40 determines whether or not an operation command from the user is received (step S22).

When receiving the operation command from the user (Yes in step S22), the control unit 40 follows the operation command from the user, and does not perform the returning operation to the charging station.

On the other hand, when not receiving the operation command from the user (No in step S22), the control unit 40 makes determination in step S23 (step S23).

Next, in step S23, the control unit 40 determines whether or not a signal from the charging station is received (step S23).

When receiving the signal from the charging station (Yes in step S23), the control unit 40 makes determination in step S24 (step S24).

On the other hand, when not receiving the signal from the charging station (No in step S23), the control unit 40 does not perform the returning operation to the charging station.

Next, in step S24, the control unit 40 determines whether or not the self-propelled vacuum cleaner 1 is in contact with the floor surface FL (step S24).

Specifically, the control unit 40 determines that the self-propelled vacuum cleaner 1 is in contact with the floor surface FL when the following condition (1) and/or condition (2) is satisfied.

(1) At least one floor surface detection sensor 18 detects the floor surface FL.

(2) The wheel drop sensor 220 does not detect loss of contact of the drive wheels 22L and 22R with the floor surface FL.

In addition, when the user carries the self-propelled vacuum cleaner 1, the user's hand may hit the bumper $2c_1$, and the moving object detection unit 43b may detect the user's hand, in general. In view of this, the following condition (3) may also be considered as a determination reference for determining whether the self-propelled vacuum cleaner 1 is carried by the user.

(3) The moving object detection unit 43b does not detect an obstacle (user's hand).

When the self-propelled vacuum cleaner 1 is in contact with the floor surface FL (Yes in step S24), the control unit 40 executes, in step S25, the returning operation to the charging station according to a predetermined procedure (step S25).

On the other hand, when the self-propelled vacuum cleaner 1 is not in contact with the floor surface FL (No in step S24), the control unit 40 determines that the self-propelled vacuum cleaner 1 is earned by the user, and does not perform the returning operation to the charging station.

Finally, in step S26, the control unit 40 determines whether or not the self-propelled vacuum cleaner 1 returns to the charging station (step S26).

When the self-propelled vacuum cleaner 1 returns to the charging station (Yes in step S26), the control unit 40 ends the returning operation.

On the other hand, when the self-propelled vacuum cleaner 1 does not return to the charging station (No in step S26), the control unit 40 continues the process in step S25 (step S25).

In this way, the self-propelled vacuum cleaner 1 which operates as described below can be implemented. Specifically, when the self-propelled vacuum cleaner 1 moves away from the charging station, the control unit 40 determines whether or not this movement occurs without the user's intention, and if this movement occurs without the user's intention, the self-propelled vacuum cleaner 1 can automatically return to the charging station without bothering the user.

In addition, if the movement of the self-propelled vacuum cleaner 1 away from the charging station occurs by the intention of the user carrying the self-propelled vacuum cleaner 1 by oneself, the self-propelled vacuum cleaner 1 does not perform the returning operation, whereby safety of the user can be ensured.

Furthermore, the self-propelled vacuum cleaner 1 can be configured not to perform the automatic returning operation to the charging station in the event of an electric power failure by controlling the charging station such that the charging station does not emit a signal in the event of an electric power failure.

According to this configuration, when the self-propelled vacuum cleaner 1 which moves away from the charging station in the event of an earthquake moves around the room, a user's risk of stumbling over the self-propelled vacuum cleaner 1 can be reduced.

Second Embodiment

<Travel Method, after Detection of Loss of Contact of the Drive Wheel 22L (22R) of the Self-Propelled Vacuum Cleaner 1 According to the Second Embodiment>

Next, a travel method after the detection of loss of contact of the drive wheel 22L (22R) of the self-propelled vacuum cleaner 1 according to the second embodiment of the present invention will be described.

In the second embodiment, when the drive wheel 22L (22R) is rotated in a direction opposite to the rotational direction before it is stopped in step S8 in FIG. 11, the left and right drive wheels 22L and 22R are controlled to rotate at different speeds. Specifically, the drive wheel 22L (22R) which is not in contact with the floor surface rotates at a higher speed, and the drive wheel 22R (or 22L) which is in contact with the floor surface rotates at a lower speed.

According to this configuration, when the wheel drop condition occurs because the drive wheel 22L (or 22R) of the self-propelled vacuum cleaner 1 drops off from the floor surface FL on the downward level difference DL, the rotational speed of the drive wheel 22R (or 22L) which is in contact with the floor surface FL is decreased, whereby the housing 2 can move backward in a direction away from the downward level difference DL.

If both of the left and right drive wheels 22L and 22R lose contact with the floor surface FL, the rotational speed of the drive wheel 22L (22R) which loses contact later is increased (post-win).

Other Embodiments

1. In the first or second embodiment, the rotational speed of the drive wheel 22L (or 22R) in the forward movement or backward movement after the detection of loss of contact of the drive wheel 22L (22R) with the floor surface may be changed (Third Embodiment).

For example, the rotational speed of the drive wheel 22L (22R) in the backward movement may be set as follows.
(1) 200 mm/sec
(2) 180 mm/sec
(3) 160 mm/sec According to this configuration, a risk of falling in the backward movement can be reduced by adjusting the height of the upward level difference RL the self-propelled vacuum cleaner 1 can climb on in the forward movement or adjusting the escaping speed from the loss-of-contact state in the backward movement.

2. In the first to third embodiments, the rotational speed of the drive wheel 22L (22R) in the forward movement or the backward movement after the detection of loss of contact of the drive wheel 22L (22R) with the floor surface may be changed with time, as appropriate (Fourth Embodiment).

For example, it is considered that, just after the loss of contact of the drive wheel 22L (22R) with the floor surface is detected, the rotational speed is increased, and then, the rotational speed is decreased.

According to this configuration, the function of climbing over the upward level difference RL can be enhanced, and the risk of falling down the downward level difference DL can be reduced.

3. In the first to fourth embodiments, the operation continuation time of the drive wheel 22L (or 22R) in the forward movement or backward movement after the detection of loss of contact of the drive wheel 22L (22R) with the floor surface may be changed (Fifth Embodiment).

For example, the operation continuation time of the drive wheel 22L (22R) in the forward movement and the backward movement may be set as follows.
(1) Forward movement: 1000 msec, Backward movement: 1900 msec
(2) Forward movement: 800 msec. Backward movement: 1600 msec
(3) Forward movement: 1200 msec, Backward movement: 2000 msec According to this configuration, a risk of falling in the backward movement can be reduced toy adjusting the height of the upward level difference RL the self-propelled vacuum cleaner 1 can climb on in the forward movement or adjusting the time for the escape from the loss-of-contact state in the backward movement.

4. In the second embodiment, the rotational direction of the drive wheel 22L and 22R in the backward movement may be changed (Sixth Embodiment).

For example, the following may be considered as the speed of the drive wheel 22L (22R) in the backward movement.
(1) The drive wheel 22L (or 22R) which is not in contact with the floor surface is moved backward at 20 mm/sec.
The drive wheel 22R (or 22L) which is in contact with the floor surface is moved backward at 5 mm/sec.
(2) The drive wheel 22L (or 22R) which is not in contact with the floor surface is moved backward at 20 mm/sec.
The drive wheel 22R (or 22L) which is in contact, with the floor surface is moved forward at 5 mm/sec.

According to this configuration, a risk of falling in the backward movement can be reduced by adjusting the direction of escape from the loss-of-contact state in the backward movement.

As described above,
(i) the self-propelled electronic device according to the present invention comprises: a housing; a drive wheel that, enables the housing to travel; a wheel drop sensor that detects loss of contact of the drive wheel with a floor surface; and a travel control unit that controls travel of the housing, wherein, when the wheel drop sensor detects loss of contact of the drive wheel with the floor surface, the travel control, unit continues travel of the housing for a predetermined continuous travel time, and if the wheel drop sensor still detects loss of contact of the drive wheel with the floor surface after the continuous travel time has elapsed, the travel control unit stops the rotation of the drive wheel, and then, rotates the drive wheel in a direction opposite to the direction of the rotation for a predetermined reverse travel time, to cause the housing to travel in a reverse direction.

In addition, a travel method for a self-propelled electronic device according to the present invention is characterized in that, when loss of contact of a drive wheel for enabling a housing to travel with a floor surface is detected, travel of the housing is continued for a predetermined continuous travel time, and if loss of contact of the drive wheel with the floor surface is still detected after the continuous travel time has elapsed, the rotation of the drive wheel is stopped, and then, the drive wheel is rotated in a direction opposite to the direction of the rotation for a predetermined reverse travel time, to cause the housing to travel in a reverse direction.

In the present invention, the "self-propelled electronic device" executes an operation such as a cleaning operation, an air purification operation, and an ion generating operation, while traveling. One example of a specific mode of the self-propelled electronic device is a self-propelled vacuum cleaner, for example. The self-propelled vacuum cleaner means a vacuum cleaner which autonomously performs a cleaning operation and which is provided with a housing having a dust-collecting unit inside and a suction opening on a bottom surface, drive wheels for causing the housing to travel, a control unit for controlling the rotation, stop, and the rotational direction of the drive wheels, and the like. One example of the self-propelled vacuum cleaner is shown in the embodiments described above with reference to the drawings.

In addition, the self-propelled electronic device according to the present invention includes not only the self-propelled vacuum cleaner but also, for example, a self-propelled air purifier that suctions air and exhausts purified air, a self-propelled ion generator that generates ions, a device that presents information or the like necessary for a user, and a self-propelled robot that can meet the requirement of the user.

In addition, the "wheel drop sensor" detects loss of contact of the drive wheel caused by drop-off of the drive wheel from the floor surface on a downward level difference or caused by the self-propelled electronic device climbing on an upward level difference as a result of an attempt to climb over the upward level difference.

The "continuous travel time" indicates a time when the self-propelled electronic device continues to travel after the loss of contact of the drive wheel with the floor surface is detected.

The "reverse travel time" indicates a time when the housing is caused to travel in the reverse direction to allow the device to escape from the loss-of-contact state of the drive wheel after the rotation of the drive wheel is stopped.

"To travel in the reverse direction" indicates that the self-propelled electronic device travels in a direction opposite to the travel direction thereof before the detection of loss of contact of the drive wheel with the floor surface.

For example, when loss of contact of the drive wheel with the floor surface occurs while the self-propelled electronic device is moving forward, the terminology of "traveling in the reverse direction" means that the self-propelled electronic device travels in a direction in which it moves backward.

When loss of contact of the drive wheel with the floor surface occurs while the self-propelled electronic device is moving backward, the terminology of "traveling in the reverse direction" means that the self-propelled electronic device travels in a direction in which it moves forward.

The "floor surface" indicates a surface with which the drive wheel is in contact, and it is not limited to an actual floor surface. For example, when there is an upward level difference on a floor surface, and the drive wheel is in contact with the surface of the upward level difference, the surface of the upward level difference is the "floor surface". In addition, when two or more drive wheels are in contact with surfaces of different level differences, the respective surfaces of the different level differences with which the respective drive wheels are in contact are the "floor surface".

Preferable modes of the present invention will further be described.

(ii) The self-propelled electronic device according to the present invention may further comprise a notification unit that provides notification regarding predetermined information, wherein, when the loss of contact of the drive wheel with the floor surface is still detected after the lapse of the reverse travel time, the travel control unit may stop the drive wheel, and the notification unit may provide error information.

According to this configuration, a self-propelled electronic device can be implemented which can notify the user of error information after being stopped, when being in a situation where the self-propelled electronic device cannot free oneself from a wheel drop condition even if it travels in a reverse direction.

Examples of the method for "notifying the user of error information" include issuing an alarm sound to the user, displaying a reel warning lamp on a top surface of the housing or other locations, and transmitting error information to be displayed to a mobile terminal of the user.

(iii) In the self-propelled electronic device according to the present invention, the continuous travel time may be equal to or longer than a time from when the drive wheel loses contact with the floor surface due to collision between the drive wheel and a level difference having the maximum height the housing is able to climb over till the drive wheel is again in contact with the floor surface, when the housing attempts to climb over the level difference from front.

According to this configuration, the self-propelled electronic device continuously travels for a time minimum necessary for the device to climb over the level difference even after the loss of contact of the drive wheel of the self-propelled electronic device is detected, whereby the self-propelled vacuum cleaner with less deterioration in the function of climbing over the level difference can be implemented.

The "level difference having the maximum height the housing is able to climb over" depends on a model type of the self-propelled electronic device, and may vary depending on the size, height, travel speed, or the like of the self-propelled electronic device, for example.

(iv) In the self-propelled electronic device according to the present invention, the reverse travel time may be equal to or longer than a minimum time necessary for escape from a loss-of-contact state of the drive wheel after the rotation of the drive wheel is stopped.

According to this configuration, the self-propelled electronic device can be Implemented which can free oneself from the loss-of-contact state of the drive wheel after the rotation of the drive wheel of the self-propelled electronic device is stopped.

(v) In the self-propelled electronic device according to the present invention, the drive wheel may include a left drive wheel and a right drive wheel which are independently driven, and when the wheel drop sensor detects loss of contact of one of the left drive wheel and the right drive wheel, the travel control emit may rotate the left drive wheel and the right drive wheel in the opposite direction such that the rotational speed of the drive wheel which is not detected to have loss of contact is lower than the rotational speed of the drive wheel which is detected to have loss of contact.

According to this configuration, the self-propelled electronic device can be implemented which can efficiently free oneself from the loss-of-contact state of the drive wheel while reducing a risk of falling from a floor surface.

(vi) In the self-propelled electronic device according to the present invention, the drive wheel may include a left drive wheel and a right drive wheel which are independently driven, and when the wheel drop sensor detects loss of contact of both the left drive wheel and the right drive wheel with the floor surface, the travel control unit may rotate the left drive wheel and the right drive wheel in the opposite direction such that the rotational speed of the drive wheel which is detected earlier to have loss of contact is lower than the drive wheel which is detected later to have loss of contact.

According to this configuration, the self-propelled electronic device can be implemented which can efficiently free oneself from the loss-of-contact state of the drive wheel, while reducing a risk of failing down the floor surface, even when loss of contact of both the left drive wheel and the right drive wheel is detected.

The preferable modes of the present invention also include modes obtained by combining some of the above-mentioned modes.

Besides the embodiments described above, various modifications are possible for the present invention. These modifications should not be deemed to be out of the scope of the present invention. The present invention should include all the modifications within the scope of the claims, their equivalents, and within the above scope.

DESCRIPTION OF REFERENCE SIGNS

1 Self-propelled vacuum cleaner
2 Housing
2$a$ Bottom plate
2$a_2$ Opening
2$a_4$ Support member
2$b$ Top plate
2$c$ Side plate
2$c_1$ Bumper
2$c_2$ Rear side plate
2$s_1$ Intermediate space
2$s_2$ Rear space
2$x$ Housing main body
2$x_1$ Front opening
6 Ultrasonic sensor
6$a$ Control unit
6$b_1$ Ultrasonic wave transmitting unit
6$b_2$ Ultrasonic wave receiving unit
9 Rotary brush
10 Side brush
13 Charging terminal
15 Dust-collecting chamber
15$a$ Dust-collecting box
15$a_1$ Suction opening
15$a_2$ Discharge opening
15$b$ Filter
15$c$ Cover
18 Floor surface detection sensor
18$a$ Control unit
22L, 22R Drive wheel
26 Rear wheel
31 Suction opening
32 Exhaust opening
34 Exhaust path
40 Control unit
41 Operation panel
42 Storage unit
42$a$ Travel map
43 Collision detection unit
43$a$ Control unit
43$b$ Moving object detection unit
50 Electrically powered fan
50$a$, 51$a$, 52$a$ Motor driver
51 Travel motor
52 Brush motor
114 Duct
120 Ion generator
220 Wheel drop sensor
221 Support arm
222 Rotation support shaft
223 Slit
224 Optical sensor
225 Optical signal
A, B Arrow
RL Upward level difference
DL Downward level difference
FL Floor surface
UL, UR Drive wheel unit

What is claimed is:

1. A self-propelled electronic device comprising: a housing; a drive wheel that enables the housing to travel; a wheel drop sensor that detects loss of contact of the drive wheel with a floor surface; and a travel control unit that controls travel of the housing,
wherein, when the drive wheel is in contact with the ground, the drive wheel pivots upward relative to the housing and when the drive wheel is separated from the ground, the drive wheel pivots downward relative to the housing,
wherein, if the drive wheel pivots downward relative to the housing, it can be determined that the wheel drop sensor detects loss of contact of the drive wheel with the floor surface,
wherein, when the wheel drop sensor detects loss of contact of the drive wheel with the floor surface, the travel control unit continues travel of the housing for a predetermined continuous travel time, and if the wheel drop sensor still detects loss of contact of the drive wheel with the floor surface after the continuous travel time has elapsed, the travel control unit stops the rotation of the drive wheel, and then, rotates the drive wheel in a direction opposite to the direction of the rotation for a predetermined reverse travel time, to cause the housing to travel in a reverse direction, and
wherein the drive wheel includes a left drive wheel and a right drive wheel which are independently driven, and when the wheel drop sensor detects loss of contact of one of the left drive wheel and the right drive wheel, the travel control unit rotates the left drive wheel and the right drive wheel in the opposite direction such that when the wheel drop sensor detects contact of both of the left drive wheel and the right drive wheel, the rotational speed of the drive wheel which is not detected to have loss of contact is lower than the rotational speed of the drive wheel which is detected to have loss of contact.

2. The self-propelled electronic device according to claim 1, further comprising a notification unit that provides notification regarding predetermined information, wherein, when the loss of contact of the drive wheel with the floor surface is still detected after the lapse of the reverse travel time, the travel control unit stops the drive wheel, and the notification unit provides error information.

3. The self-propelled electronic device according to claim 1, the continuous travel time is equal to or longer than a time from when the drive wheel loses contact with the floor surface due to collision between the drive wheel and a level difference having the maximum height the housing is able to climb over till the drive wheel is again in contact with the floor surface, when the housing attempts to climb over the level difference from front.

4. The self-propelled electronic device according to claim 1, the reverse travel time is equal to or longer than a minimum time necessary for escape from a loss-of-contact state of the drive wheel after the rotation of the drive wheel is stopped.

5. A self-propelled electronic device comprising: a housing; a drive wheel that enables the housing to travel; a wheel drop sensor that detects loss of contact of the drive wheel with a floor surface; and a travel control unit that controls travel of the housing, wherein, when the drive wheel is in contact with the ground, the drive wheel pivots upward relative to the housing and when the drive wheel is separated from the ground, the drive wheel pivots downward relative to the housing, wherein, if the drive wheel pivots downward relative to the housing, it can be determined that the wheel drop sensor detects loss of contact of the drive wheel with a floor surface, wherein, when the wheel drop sensor detects loss of contact of the drive wheel with the floor surface, the travel control unit continues travel of the housing for a predetermined continuous travel time, and if the wheel drop sensor still detects loss of contact of the drive wheel with the floor surface after the continuous travel time has elapsed, the travel control unit stops the rotation of the drive wheel, and then, rotates the drive wheel in a direction opposite to the direction of the rotation for a predetermined reverse travel time, to cause the housing to travel in a reverse direction, and wherein the drive wheel includes a left drive wheel and a right drive wheel which are independently driven, and when the wheel drop sensor detects loss of contact of both the left drive wheel and the right drive wheel with the floor surface, the travel control unit rotates the left drive wheel and the right drive wheel in the opposite direction such that when the wheel drop sensor detects contact of both of the left drive wheel and the right drive wheel, the rotational speed of the drive wheel which is detected earlier to have loss of contact is lower than the drive wheel which is detected later to have loss of contact.

6. The self-propelled electronic device according to claim 5, further comprising a notification unit that provides notification regarding predetermined information, wherein, when the loss of contact of the drive wheel with the floor surface is still detected after the lapse of the reverse travel time, the travel control unit stops the drive wheel, and the notification unit provides error information.

7. The self-propelled electronic device according to claim 5, the continuous travel time is equal to or longer than a time from when the drive wheel loses contact with the floor surface due to collision between the drive wheel and a level difference having the maximum height the housing is able to climb over till the drive wheel is again in contact with the floor surface, when the housing attempts to climb over the level difference from front.

8. The self-propelled electronic device according to claim 5, the reverse travel time is equal to or longer than a minimum time necessary for escape from a loss-of-contact state of the drive wheel after the rotation of the drive wheel is stopped.

* * * * *